US012515131B2

(12) United States Patent
Wu et al.

(10) Patent No.: US 12,515,131 B2
(45) Date of Patent: Jan. 6, 2026

(54) DISPLAY METHOD AND APPARATUS FOR VIRTUAL PROP, ELECTRONIC DEVICE AND STORAGE MEDIUM

(71) Applicant: TENCENT TECHNOLOGY (SHENZHEN) COMPANY LTD, Guangdong (CN)

(72) Inventors: Tian Wu, Shenzhen (CN); Ruobing Chai, Shenzhen (CN); Junxiong Zhong, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 349 days.

(21) Appl. No.: 18/296,684

(22) Filed: Apr. 6, 2023

(65) Prior Publication Data

US 2023/0241501 A1 Aug. 3, 2023

Related U.S. Application Data

(63) Continuation of application No. PCT/CN2022/090964, filed on May 5, 2022.

(30) Foreign Application Priority Data

Jun. 9, 2021 (CN) .......................... 202110642665.2

(51) Int. Cl.
*A63F 13/5372* (2014.01)
*A63F 13/2145* (2014.01)
(Continued)

(52) U.S. Cl.
CPC ...... *A63F 13/5372* (2014.09); *A63F 13/2145* (2014.09); *A63F 13/533* (2014.09); *G06F 3/04847* (2013.01); *G06F 3/0488* (2013.01)

(58) Field of Classification Search
CPC .. A63F 13/426; A63F 13/214; A63F 13/2145; A63F 13/5372; A63F 13/533
See application file for complete search history.

(56) References Cited

U.S. PATENT DOCUMENTS 7,682,250 B2 * 3/2010 Ikebata .................... A63F 13/42
463/31
9,174,131 B2 * 11/2015 Shirasaka ............. A63F 13/822
(Continued)

FOREIGN PATENT DOCUMENTS

| CN | 108837506 A | 11/2018 |
|----|-------------|---------|
| CN | 110270098 A | 9/2019 |

(Continued)

OTHER PUBLICATIONS

Japanese Office Action dated Mar. 18, 2025 in Application No. 2023-558624.

(Continued)

*Primary Examiner* — Chase E Leichliter
(74) *Attorney, Agent, or Firm* — Sughrue Mion, PLLC

(57) ABSTRACT

A display method and apparatus for a virtual prop, an electronic device and a non-transitory computer-readable storage medium. The method includes: displaying a virtual prop list in a virtual scene, the virtual prop list having an interactive option for at least one virtual prop, displaying based on a slide operation on the interactive option for a target virtual prop in the virtual prop list meeting a first target condition, a first target region, and marking the target virtual prop based on an operation end point of the slide operation being within the first target region.

18 Claims, 8 Drawing Sheets

(51) Int. Cl.
*A63F 13/533* (2014.01)
*G06F 3/04847* (2022.01)
*G06F 3/0488* (2022.01)

(56) References Cited

U.S. PATENT DOCUMENTS

| | | | | |
|---|---|---|---|---|
| 10,786,733 | B2* | 9/2020 | Tang | A63F 13/422 |
| 10,831,258 | B2* | 11/2020 | Tanzawa | A63F 13/426 |
| 11,278,811 | B2* | 3/2022 | Yoshihara | A63F 13/52 |
| 11,298,609 | B2* | 4/2022 | Wang | G06F 3/04883 |
| 11,446,565 | B2* | 9/2022 | Shao | A63F 13/92 |
| 11,511,184 | B2* | 11/2022 | Shao | A63F 13/56 |
| 11,541,311 | B2* | 1/2023 | Kurabayashi | A63F 13/573 |
| 11,617,948 | B2* | 4/2023 | Sensui | A63F 13/533 |
| | | | | 463/31 |
| 11,752,432 | B2* | 9/2023 | Ito | A63F 13/2145 |
| | | | | 463/31 |
| 11,759,702 | B2* | 9/2023 | Miyano | G06F 3/04842 |
| | | | | 463/37 |
| 11,862,036 | B2* | 1/2024 | Molenje | G06F 3/04883 |
| 2010/0035692 | A1* | 2/2010 | Reville | A63F 13/85 |
| | | | | 463/43 |
| 2010/0188344 | A1 | 7/2010 | Shirakawa et al. | |
| 2016/0132209 | A1* | 5/2016 | Abe | G06F 3/04842 |
| | | | | 715/834 |
| 2016/0364133 | A1* | 12/2016 | Hosaka | A63F 13/493 |
| 2018/0093180 | A1* | 4/2018 | Yamanokuchi | G06F 3/04883 |
| 2019/0366213 | A1* | 12/2019 | Zhou | A63F 13/533 |
| 2020/0023280 | A1* | 1/2020 | Onda | A63F 13/35 |
| 2020/0353355 | A1* | 11/2020 | Wang | G06F 3/0481 |
| 2021/0200861 | A1* | 7/2021 | Wu | A63F 13/92 |
| 2021/0291054 | A1 | 9/2021 | Tian et al. | |
| 2021/0316215 | A1* | 10/2021 | Sensui | A63F 13/533 |
| 2021/0342831 | A1* | 11/2021 | Jeong | A63F 13/35 |
| 2022/0288491 | A1* | 9/2022 | Xiao | A63F 13/847 |
| 2023/0241501 | A1* | 8/2023 | Wu | A63F 13/5372 |
| | | | | 463/31 |
| 2023/0330537 | A1* | 10/2023 | Cui | A63F 13/537 |
| 2023/0333718 | A1* | 10/2023 | Wu | A63F 13/42 |
| 2024/0029137 | A1* | 1/2024 | Zhang | A63F 13/87 |

FOREIGN PATENT DOCUMENTS

| | | |
|---|---|---|
| CN | 111475087 A | 7/2020 |
| CN | 111589103 A | 8/2020 |
| CN | 112044067 A | 12/2020 |
| CN | 113289331 A | 8/2021 |
| JP | 2010-170479 A | 8/2010 |
| JP | 2020-044139 A | 3/2020 |
| JP | 2020-72801 A | 5/2020 |

OTHER PUBLICATIONS

Written Opinion for PCT/CN2022/090964, dated Aug. 3, 2022.
Communication dated Sep. 2, 2024 from the Japanese Patent Office in Application No. 2023-558624.
Chinese Office Action for CN 202110642665.2, dated Aug. 25, 2022.
International Search Report for PCT/CN2022/090964, dated Aug. 3, 2022.

* cited by examiner

DISPLAY METHOD AND APPARATUS FOR VIRTUAL PROP, ELECTRONIC DEVICE AND STORAGE MEDIUM

CROSS-REFERENCE TO RELATED APPLICATION(S)

This application is a continuation application of International Application No. PCT/CN2022/090964 filed on May 5, 2022, which claims the priority to Chinese Patent Application No. 202110642665.2 filed with the National Intellectual Property Administration, PRC on Jun. 9, 2021, the disclosures of which are incorporated by reference herein in their entireties.

FIELD

The disclosure relates to the technical field of computers, and particularly relates to a display method and apparatus for a virtual prop, an electronic device and a storage medium.

BACKGROUND

With the development of the computer technology and the diversification of terminal functions, more and more kinds of games can be played on a terminal. The terminal displays a virtual scene in a game application; and a virtual object and a virtual prop available for pickup or selection are displayed in the virtual scene. Due to a wide variety of virtual props, various virtual props are typically displayed as a list of virtual props.

SUMMARY

The embodiments of the disclosure provide a display method and apparatus for a virtual prop, an electronic device and a storage medium.

Some embodiments provide a display method for a virtual prop, performed by computer device, the method including: displaying a virtual prop list in a virtual scene, where the virtual prop list having an interactive option for at least one virtual prop; displaying, based on a slide operation on the interactive option for a target virtual prop in the virtual prop list meeting a first target condition, a first target; and marking the target virtual prop in the virtual scene based an operation end point of the slide operation being within the first target region.

Some embodiments provide a display apparatus for a virtual prop, including: at least one memory configured to store program code; and at least one processor configured to read the program code and operate as instructed by the program code, the program code including: a first display module configured to display a virtual prop list in a virtual scene, where the virtual prop list having an interactive option for at least one virtual prop; a second display module configured to display, based on a slide operation on the interactive option for the target virtual prop in the virtual prop list meeting a first target condition, a first target region; and a third display module configured to mark the target virtual prop in the virtual scene based on an operation end point of the slide operation being within the first target region.

Some embodiments provide an electronic device, including one or more processors and one or more memories having stored therein at least one computer program, the at least one computer program is loaded and executed by the one or more processors to implement the above-mentioned display method for the virtual prop.

Some embodiments provide a storage medium, having stored therein at least one computer program. The at least one computer program is loaded and executed by a processor to implement the above-mentioned display method for the virtual prop.

Some embodiments provide a computer program product or a computer program, including one or more program codes that are stored in a computer-readable storage medium. The one or more processors of the electronic device can read the one or more program codes from the computer-readable storage medium; and the one or more processors execute the one or more program codes to enable the electronic device to execute the above-mentioned display method for the virtual prop.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
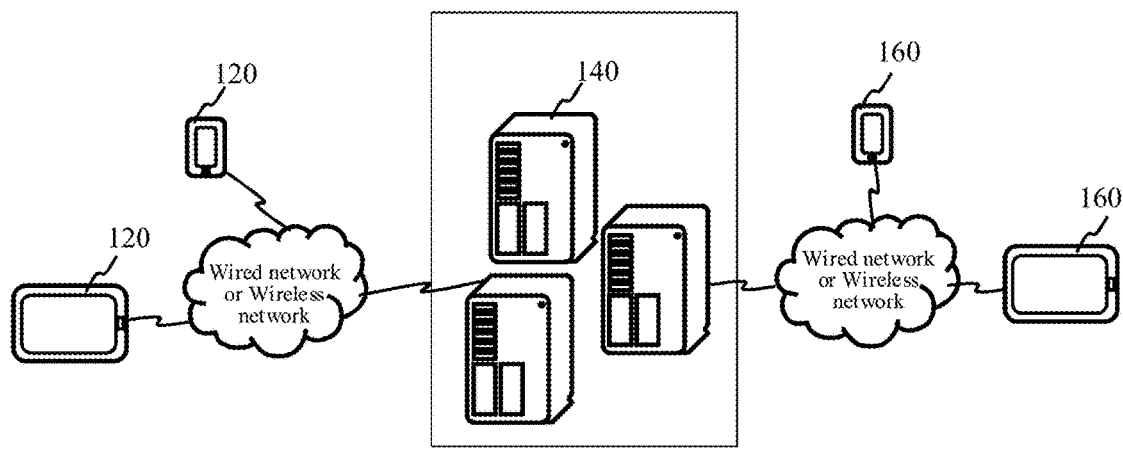
FIG. 1 is a schematic diagram of an implementation environment of a display method for a virtual prop according to some embodiments.

In the technical solution provided by the embodiments of the disclosure, provided is a novel human-computer interaction mode of marking the virtual prop, in which when it is detected that a user performs a slide operation on the interactive option for the target virtual prop in the virtual prop list, the first target region is displayed; and when the user drags the interactive option to the first target region, it is considered that the target virtual prop is marked, and the target virtual prop is distinctively displayed. Compared with a mode of adding a mark button on the right of the interactive option for each virtual prop in the virtual prop list, since in this solution, it is needed to drag the interactive option to the first target region to complete marking, the false touch rate of user operation is greatly reduced, the operation mode is simple, convenient and rapid, and then the human-computer interaction efficiency can be improved.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The terms "first", "second", and the like are used herein to distinguish the same or similar items that perform substantially the same effect and function, and it is to be understood that the terms "first", "second", and "nth" do not have a logical or chronological dependency on each other or limit the number and order of execution.

The term "at least one" in the disclosure means one or more, the meaning of "a plurality of" means two or more, for example, a plurality of virtual objects means two or more virtual objects.

With the development of the computer technology and the diversification of terminal functions, more and more kinds of games can be played on a terminal. The terminal displays a virtual scene in a game application; and a virtual object and a virtual prop available for pickup or selection are displayed in the virtual scene. Due to a wide variety of virtual props, various virtual props are typically displayed as a list of virtual props.

For some virtual props with important functions in a game, a user has a need for marking such virtual props. In order to satisfy the prop marking demand of the user, a mark button is usually provided for each virtual prop on the right of a virtual prop list; and the user finds a virtual prop needing to be marked in the virtual prop list, and clicks/taps the mark button provided on the right of the virtual prop to mark the virtual prop.

In the above-mentioned process, the user may trigger to mark the virtual prop if the user clicks/taps the mark button for the virtual prop, and it is very easy to make a false touch; and after the false touch occurs, the user also needs to cancel the mark for the virtual prop. As a result, the overall human-computer interaction mode has a high false touch rate, a high degree of complexity and poor convenience, and thus the human-computer interaction efficiency is low.

Hereinafter, the involved terms in the disclosure are explained.

Virtual Scene: it is a virtual scene displayed (or provided) when an application when running on a terminal. In some embodiments, the virtual scene is, for the real world, a simulation environment, or a semi-simulation semi-fictional virtual environment, or a purely fictional virtual environment. In some embodiments, the virtual scene is any one of a two-dimensional virtual scene, a 2.5-dimensional virtual scene or a three-dimensional virtual scene, and the dimensions of the virtual scene are not limited thereto. For example, the virtual scene includes the sky, the land, the sea, etc.; the land includes environmental elements such as a desert, a city, etc.; and a user can control a virtual object to move within the virtual scene. In some embodiments, the virtual scene is further used for virtual scene confrontation between at least two virtual objects; and in the virtual scene, there are virtual resources available for the at least two virtual objects.

Virtual object: it refers to a movable object in the virtual scene. In some embodiments, the movable object is a virtual character, a virtual animal, a virtual genie, a cartoon character, etc. such as: a character, an animal, a plant, an oil bucket, a wall, a stone, etc. displayed in the virtual scene. In some embodiments, the virtual object is a virtual image for representing the user in the virtual scene. In some embodiments, a plurality of virtual objects are included in the virtual scene; and each virtual object has its own shape and volume in the virtual scene, occupying a portion of a space in the virtual scene. In some embodiments, if the virtual scene is a three-dimensional virtual scene, the virtual object is a three-dimensional stereoscopic model; the three-dimensional stereoscopic model is a three-dimensional character constructed based on a three-dimensional human skeleton technology; and the same virtual object can show different external images by wearing different skins. In some embodiments, the virtual object is implemented using a 2.5-dimensional or two-dimensional model, and the embodiments of the disclosure do not limit the model dimensions of the virtual object.

In some embodiments, the virtual object is a player character controlled by an operation on a client or a non-player character (NPC) set in the virtual scene. In some embodiments, the virtual object is a virtual character competing in the virtual scene. In some embodiments, the number of the virtual objects participating in interaction in the virtual scene is preset or dynamically determined according to the number of the clients joining interaction.

A multiplayer online battle arena (MOBA) game: it is a game which provides several footholds in the virtual scene, and users in different camps control the virtual objects to make confrontation for occupying the footholds or destroying the footholds in different camps in the virtual scene. For example, in the MOBA game, the users are divided into at least two camps; different virtual teams belonging to the at least two camps occupy respective map regions; and distributes the virtual objects controlled by the users in the virtual scene to compete with each other, with destroying or occupying all the adverse footholds as a winning condition.

A shooter game (STG): it refers to a kind of games that the virtual objects use hot weapon virtual props for remote attacks; and the shooter game is a kind of action games with obvious characteristics of the action games. In some embodiments, the shooter games include, but are not limited to, a first-person shooting game, a third-person shooter game, a top shooter game, a head-up shooter game, a platform shooter game, a scroll shooter game, a light gun shooter game, a keyboard-mouse shooter game, a shooting range game, etc.; and the embodiments of the disclosure do not specifically limit the type of shooter games.

A First-Person shooting (FPS) game: it refers to a shooter game performed by a user from a first person perspective, and a virtual scene picture in the FPS game is a picture for observing the virtual scene from the perspective of the virtual object controlled by a terminal. In the FPS game, at least two virtual objects perform a single game confrontation mode in the virtual scene; one virtual object achieves a purpose of surviving in the virtual scene by avoiding attacks initiated by other virtual objects and dangers (such as a swamp) existing in the virtual scene; if a virtual hit point of one virtual object in the virtual scene is less than a preset hit point, the life of the virtual object in the virtual scene is over; and finally, the virtual objects surviving in the virtual scene are winners, where the preset hit point is any numerical value greater than or equal to 0. In some embodiments, in the FPS game, each terminal is capable of controlling one or more virtual objects in the virtual scene with a time at which the first terminal joins confrontation being a start time and a time at which the last terminal exits confrontation being an end time. In some embodiments, competitive modes of confrontation include a single-person confrontation mode, a double-person group confrontation mode or a multi-person large group confrontation mode, etc.; and the embodiments of the disclosure do not specifically limit the competitive modes.

Taking the shooter game as an example, the user can control the virtual object to freely fall, glide or open a parachute to fall, etc. in the sky in the virtual scene, run, jump, crawl, walk in a bending posture, etc. on the land, and can also control the virtual object to swim, float or dive, etc. in the sea. Of course, the user can also control the virtual object to move in the virtual scene with a virtual carrier, where the virtual carrier includes a virtual automobile, a virtual aircraft, a virtual yacht, etc. In some embodiments, the user can further control the virtual object to interact with other virtual objects via a virtual prop, and the virtual prop includes: a throwing prop which can only act after throwing, a shooting prop which launches some projectiles through aimed shooting and a cold weapon props for close confrontation.

The display method for the virtual prop provided by the embodiments of the disclosure can be applied to a virtual prop mark of the MOBA game, a virtual prop mark of the FPS game, a virtual prop mark of a game combining the MOBA with the FPS, or other various game applications providing the pickable or selectable virtual props, which is not specifically limited by the embodiments of the disclosure.

FIG. 1 is a schematic diagram of an implementation environment of a display method for a virtual prop according to some embodiments. With reference to FIG. 1, the implementation environment includes: a first terminal 120, a server 140 and a second terminal 160.

An application supporting a virtual scene is installed and runs on the first terminal 120. In some embodiments, the application may include any one of the MOBA game, the FPS game, the third-person shooter game, a virtual reality application, a three-dimensional map program or a multi-person instrument survival game. In some embodiments, the first terminal 120 is a terminal used by a first user; when the first terminal 120 runs the application, a user interface of the application is displayed on a screen of the first terminal 120, and a virtual scene is loaded and displayed in the application based on an opening operation of the first user in the user interface; and the first user uses the first terminal 120 to operate a first virtual object located in the virtual scene to perform an activity, and the activity includes, but is not limited to: at least one of body posture adjusting, crawling, walking, running, riding, jumping, driving, picking, selecting, shooting, and throwing. Illustratively, the first virtual object is a first virtual character, such as a simulated persona or a cartoon persona.

The first terminal 120 and the second terminal 160 are directly or indirectly in communication connection to the server 140 through wired or wireless communication.

The server 140 includes at least one of a server, a plurality of servers, a cloud computing platform, or a virtualization center. The server 140 is configured to provide a background service for the application supporting the virtual scene. In some embodiments, the server 140 undertakes a primary computing task, and the first terminal 120 and the second terminal 160 undertake a secondary computing task; or the server 140 undertakes the secondary computing task, and the first terminal 120 and the second terminal 160 undertake the primary computing task; or a distributed computing architecture is used among the three of the server 140, the first terminal 120 and the second terminal 160 to perform cooperative computing.

In some embodiments, the server 140 is an independent physical server, or a server cluster or a distributed system formed by a plurality of physical servers, or a cloud server providing basic cloud computing services such as a cloud service, a cloud database, cloud computing, a cloud function, cloud storage, a network service, cloud communication, a middleware service, a domain name service, a security service, a content distribution network (CDN) and a big data and artificial intelligence platform.

An application supporting the virtual scene is installed and runs on the second terminal 160. In some embodiments, the application includes any one of the FPS game, the third-person shooter game, the MOBA game, the virtual reality application, the three-dimensional map program or the multi-person instrument survival game. In some embodiments, the second terminal 160 is a terminal used by a second user; when the second terminal 160 runs the application, a user interface of the application is displayed on a screen of the second terminal 160, and the virtual scene is loaded and displayed in the application based on an opening operation of the second user in the user interface; and the second user uses the second terminal 160 to operate a second virtual object located in the virtual scene to perform an activity, and the activity includes, but are not limited to: at least one of body posture adjusting, crawling, walking, running, riding, jumping, driving, picking, selecting, shooting, and throwing. Illustratively, the second virtual object is a second virtual character, such as a simulated persona or a cartoon persona.

In some embodiments, the first virtual object controlled by the first terminal 120 and the second virtual object controlled by the second terminal 160 are in the same virtual scene, and at this time, the first virtual object can interact with the second virtual object in the virtual scene.

In some embodiments, the first virtual object and the second virtual object are in a confrontation relationship, for example, the first virtual object and the second virtual object belong to different teams or camps, and the virtual objects in a confrontation relationship can confront each other in a shooting manner on the land, for example, launch shooting props to each other. In some embodiments, the first virtual object and the second virtual object are friends, for example, the first virtual character and the second virtual character belong to the same camp or the same team, have a friendship, or have a temporary communication right.

In some embodiment, the applications installed on the first terminal 120 and the second terminal 160 are the same, or the applications installed on the two terminals are of a same type on different operating system platforms. The first terminal 120 or the second terminal 160 generally refers to one of a plurality of terminals, and this embodiment is exemplified only by the first terminal 120 and the second terminal 160. The device types of the first terminal 120 and the second terminal 160 are the same or different, and the device type includes: at least one of, but not limited to, a smart phone, a tablet computer, a smart speaker, a smart watch, a laptop computer, and a desktop computer. For example, the first terminal 120 and the second terminal 160 are the smart phones, or other hand-held portable game devices. The following embodiments are illustrated with the terminal including the smart phone.

A person skilled in the art will appreciate that the number of above-mentioned terminals can be greater or smaller. For example, the number of above-mentioned terminals is only one, or tens or hundreds, or more. The number of terminals and the device type is not limited herein.

Figure 2:
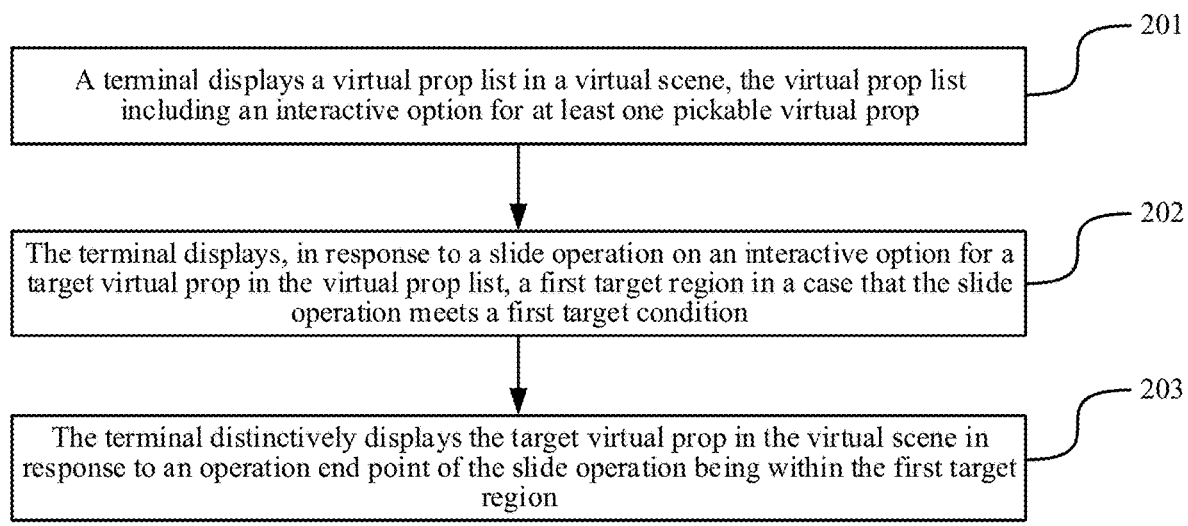
FIG. 2 is a flowchart of a display method for a virtual prop according to some embodiments.

FIG. 2 is a flowchart of a display method for a virtual prop according to some embodiments. Some embodiments may be performed by an electronic device, and the following description is given by taking the electronic device as a terminal, for example, the terminal is the first terminal 120 or the second terminal 160 shown in FIG. 1, and some embodiments include the following operations:

Operation 201, the terminal displays a virtual prop list in the virtual scene, where the virtual prop list includes an interactive option for at least one pickable or selectable virtual prop.

The terminal is the electronic device used by any user, for example, the terminal is the smart phone, the smart palmtop, a portable game device, a tablet computer, a notebook computer, a desktop computer, a smart speaker, a smart watch, etc., but is not limited thereto.

The virtual prop refers to a virtual resource which can be picked up or selected by a controlled virtual object in the virtual scene, for example, the virtual prop is a virtual weapon, a virtual article, a virtual armor, virtual ammunition, a virtual accessory, etc., and this embodiment of the disclosure does not specifically limit the type of the virtual prop. Among them, the controlled virtual object refers to a virtual object manipulated by the user using the terminal in the virtual scene, that is, the virtual object having an association relationship with the terminal.

The interactive option refers to a list item used for uniquely identifying the virtual prop in the virtual prop list, for example, each column in the virtual prop list is presented as one interactive option which can interact with the user, and each interactive option maintains one-to-one correspondence with one virtual prop.

In some embodiments, each interactive option presents different interaction functions according to different types of user interaction operations on the interactive option, and the types of the interaction functions that each interactive option can provide are not limited herein. For example, if the user clicks/taps the interactive option for any virtual prop, a floating window is triggered to show a detailed description of the virtual prop. If the user double clicks/taps the interactive option for any virtual prop, a controlled virtual object is triggered to pick up or select the virtual prop. If a user presses and holds an interactive option of any virtual prop to slide longitudinally, it is triggered to display the virtual props folded in the virtual prop list, for example, in a case of an upward slide, the virtual props folded up are displayed; and in a case of a downward slide, a virtual prop folded down is displayed, that is to say, the user can browse all the virtual props in the entire virtual prop list via the longitudinal slide. If the user holds down an interactive option for any virtual prop to slide laterally, the user can drag the interactive option out of the virtual prop list, and different functions are realized when the interactive option is dragged to different regions, for example, if the interactive option is dragged to a first target region, it is triggered to mark the virtual prop; if the interactive option is dragged to a second target region when the virtual prop is in a marked state, it is triggered to cancel the mark of the virtual prop (that is, the virtual prop is not marked any more, or the mark is removed from the virtual prop), etc.; for another example, if the interactive option is dragged to a third target region, it is triggered to transmit the virtual prop to a friend virtual object (that is, a teammate) in a specific area; for another example, if the interactive option is dragged to a fourth target region, it is triggered to the install the virtual prop (such as the virtual accessory) to a virtual instrument 1; and if the interactive option is dragged to a fifth target region, it is triggered to install the virtual prop (such as the virtual accessory) to a virtual instrument 2.

In some embodiments, the terminal initiates an application in response to an initiating operation of the user on the application, and the application is any application supporting the virtual scene. In some embodiments, the initiating operation is that the user performs a touch operation on an icon of the application on a terminal desktop, or the user inputs an initiate instruction for the application to an intelligent voice assistant; and the initiate instruction includes a voice instruction or a text instruction. The type of the initiate instruction is not limited herein. In some embodiments, the application is a game application, for example, the game application is any one of the MOBA game, a massive multiplayer online role-playing game (MMORPG), the FPS game, the third-person shooter game, the virtual reality application, the three-dimensional map program or the multi-person instrument survival game; and in some embodiments, the application is a game-type embedded program (colloquially referred to as a "game applet") in other applications, the type of the application is not limited herein.

In some embodiments, if the user sets an auto-initiation condition for the application, the terminal operating system automatically initiates the application when the terminal detects that the auto-initiation condition of the application is met; and in some embodiments, the auto-initiation condition is to initiate the application periodically, such as initiate the application at 8 o'clock every night; or the auto-initiation condition is an auto-initiation upon power-on. The auto-initiation condition of the application is not limited herein.

In some embodiments, the terminal initiates the application, and an opening configuration interface is displayed in the application, where the opening configuration interface includes an account setting control, a selection control for a competitive mode, a selection control for the virtual object, a selection control for the virtual scene (colloquially referred to as a "scene map"), an opening option, etc.

In some embodiments, the user selects a game account to be logged in in the application based on the account setting control, may log in via an account password, or may bind to a registered account in other applications, so as to be authorized log in the game application with the registered account, and can also log out of a login state via a logout operation after logging in.

In some embodiments, the user selects a competitive mode to be participated in for a current game based on the selection control for the competitive mode, for example, the competitive mode includes 2V2, 3V3, 5V5, etc.; and the embodiments do not limit the competitive mode.

In some embodiments, the user selects a controlled virtual object for playing in the current game based on the selection control for the virtual object. It is to be noted that when the controlled virtual object is selected, it is necessary to select from virtual objects which have been opened by the user (that is, allow the user to have usage rights); and some virtual objects which have not been opened by a user (that is, not allow the user to have the usage rights) cannot be selected as the controlled virtual object in the current game. In some embodiments, by using some virtual props (for example, time-limited free props, etc.), the user can temporarily have the right to use a part of the virtual objects, so that the user can experience the playing methods and feels of the part of the virtual objects. At this time, even if the user does not open a certain virtual object, if the user has the temporary right to use the virtual object, the user can still select the virtual object as the controlled virtual object used in the current game.

In some embodiments, based on the selection control for the virtual scene, the user selects the virtual scene to be loaded in the current game (that is, selects a scene map in the current game). It is to be noted that in some competitive modes, user-defined selection of the virtual scene is supported; and in some competitive modes, user-defined selection of the virtual scene may not be supported, and at this time, only the virtual scene bound to the selected competitive mode can be loaded, or a server randomly selects a virtual scene from a plurality of virtual scenes bound to the competitive mode as a virtual scene loaded in the current game. Whether the virtual scene can be independently selected is not limited herein.

In some embodiments, when the user selects a login account, a competitive mode, a controlled virtual object and a virtual scene, the taken selection operations include, but are not limited to: a click/tap operation, a long-hold operation, a double-click/tap operation, a voice instruction, a trigger operation based on a shortcut key, etc.; and the type of the selection operation is not limited herein.

In some embodiments, after completing configurations of the login account, the competitive mode, the controlled virtual object and the virtual scene, the user triggers the terminal to initiate the current game through the triggering operation on an opening option; the terminal loads the virtual scene of the current game, displays the virtual scene after the loading, and displays the virtual objects manipulated by the terminals of various users participating in the current game in the virtual scene. In some embodiments, the virtual object controlled by this terminal in the virtual scene is referred to as the controlled virtual object; the virtual object belonging to the same camp or the same team as the controlled virtual object is referred to as a friend virtual object; and the virtual object belonging to a different camp or a different team from the controlled virtual object is referred to as a non-friend virtual object.

In some embodiments, the user can control the controlled virtual object to perform the following activities in the virtual scene: body posture adjusting, crawling, walking, running, riding, jumping, driving, picking up, selecting, shooting, attacking, throwing, confrontation, etc. In some embodiments, a prop model of at least one virtual prop available for pickup or selection is also displayed in the virtual scene (a 2D model in the case of a 2D virtual scene, and a 3D model in the case of a 3D virtual scene); the terminal controls the controlled virtual object to approach any virtual prop; and if a distance between the controlled virtual object and the virtual prop is less than a distance threshold, a virtual prop list is popped up in the virtual scene, and an interactive option for at least one virtual prop available for pickup or selection is displayed in the virtual prop list, where the distance threshold is any numerical value greater than or equal to 0.

In some embodiments, when being displayed, the virtual prop list is displayed in a pop-up window or a floating floor. In some embodiments, each virtual prop whose distance to the controlled virtual object is less than the distance threshold and that can be picked up or selected is counted, and a corresponding interactive option for each virtual prop in the virtual prop list is displayed, for example, each list item in the virtual prop list is provided as an interactive option for a virtual prop. In some embodiments, at least one of a prop name, a prop picture, a prop rating, prop description information, or a prop number of a corresponding virtual prop is displayed on each interactive option.

Operation 202. A terminal responds to a slide operation on an interactive option for a target virtual prop in the virtual prop list, and if the slide operation meets a first target condition, a first target region is displayed in the virtual scene.

The target virtual prop refers to any virtual prop displayed in the virtual prop list, and is not limited herein.

In some embodiments, if the terminal detects the slide operation of the user on the interactive option for the target virtual prop, the first target region is displayed in the virtual scene in a case that the slide operation meets the first target condition. In some embodiments, upon detecting the slide operation, the terminal detects whether a user's finger touches a terminal screen via a contact sensor of the terminal screen; if the user's finger touches the terminal screen, the contact sensor is invoked to determine a screen coordinate of a touch point; if the screen coordinate of the touch point is located in a region covered by the interactive option for the target virtual prop in the terminal screen, a touch operation on the interactive option for the target virtual prop is determined to be detected; and then, in the case that a touch duration of the user's finger on the terminal screen exceeds a duration threshold and the touch point of the user's finger is displaced over time, it is then determined that the slide operation on the interactive option for the target virtual prop is detected, where the duration threshold is any numerical value greater than 0.

In some embodiments, the first target condition is set based on the type of the slide operation, for example, the first target condition includes that the slide operation is the lateral slide operation, in other words, in the case that the slide operation is the lateral slide operation, it is represented that the slide operation meets the first target condition, and the operation of displaying the first target region in the virtual scene is performed; and stated in another way, the terminal displays, in response to the lateral slide operation on the interactive option for the target virtual prop, the first target region in the virtual scene.

In the above-mentioned process, by setting the first target condition that the slide operation is the lateral slide operation, which is equivalent to only the lateral slide operation being able to trigger display of the first target region, it can be configured that different interaction functions are triggered for other types of slide operations, so as to provide different interaction functions to the user via different types of slide operations. In some embodiments, the lateral slide operation may trigger display of the first target region; and after the user drags the interactive option to the first target region, it can be triggered to mark the target virtual prop. In addition, the longitudinal slide operation triggers browsing of the folded virtual props in the entire virtual prop list, for example, the upward slide may make the user view the virtual props before the first virtual prop in the current virtual prop list; and the downward slide may make the user view the virtual props after the last virtual prop in the current virtual prop list.

In some embodiments, the terminal determines a slide direction of the slide operation when determining whether the slide operation is the lateral slide operation, and determines the slide operation as the lateral slide operation in a case that an included angle between the slide direction of the slide operation and a horizontal direction is within a target angle range. In some embodiments, a target angle range is $[-\alpha, \alpha]$, where $\alpha$ is an empirical value set by a technical person according to experience; or due to different widths of fingers of different users, the terminal collects multiple slide operations of the users and final desired operation results, and finally configures a with different values for different users; and in some embodiments, $\alpha$ can be modified or updated by the server at a cloud end, and the embodiments of the disclosure do not specifically limit the value of $\alpha$.

In some embodiments, when determining the slide direction of the slide operation, the terminal determines an operation start point (that is, an initial touch point) of the slide operation, then determines a touch point (that is, a latest touch point) of the user's finger at the current moment, and determines a ray from the two touch points (the ray takes the initial touch point as an end point and extends in a direction indicated by the latest touch point). The direction indicated by the ray is also the slide direction of the slide operation, so that a determination flow of the slide direction can be simplified.

In some embodiments, when determining the slide direction of the slide operation, the terminal determines a slide trajectory of the slide operation, and determines a tangential direction of the touch point (that is, the latest touch point) of the user's finger in the slide trajectory at the current moment as the slide direction of the slide operation, so that a more accurate slide direction can be determined when the user slides along a curve. An acquisition method for the slide direction is not limited herein.

In some embodiments, the included angle between the slide direction and the horizontal direction is determined after the slide direction of the slide operation is determined. It is to be noted that the included angle taken in the embodiments of the disclosure refers to an included angle between the slide direction and the horizontal direction, which is less than or equal to 90 degrees, rather than another complementary angle which is greater than 90 degrees.

In some embodiments, after the value of the included angle is determined, whether the included angle is greater than or equal to a minimum value (that is, a lower bound) of the target angle range and is less than or equal to a maximum value (that is, an upper bound) of the target angle range is determined; if the included angle is greater than or equal to the minimum value of the target angle range and is less than or equal to the maximum value of the target angle range, it is determined that the included angle is within the target angle range, that is, the slide operation is the lateral slide operation; otherwise, if the included angle is less than the minimum value of the target angle range or the included angle is greater than the maximum value of the target angle range, then it is determined that the included angle is not within the target angle range, and the slide operation is not the lateral slide operation.

In some embodiments, since the lateral slide operation only defines that the user slides the interactive option laterally, the lateral slide operation is also specifically divided into a left slide operation and a right slide operation. In some embodiments, the first target condition is that the slide operation is the right slide operation, that is, only when the user slides the interactive option for the target virtual prop to the right, display of the first target region can be triggered; or the first target condition is that the slide operation is the left slide operation, namely, only when the user slides the interactive option for the target virtual prop to the left, display of the first target region can be triggered; or the first target condition is that the slide operation is the left slide operation or the right slide operation, that is, whether the user slides the interactive option for the target virtual prop to the left or the right, display of the first target region can be triggered. The embodiments of the disclosure do not specifically limit the content of the first target condition.

In some embodiments, in determining whether the lateral slide operation is the left slide operation or the right slide operation, determination is made according to a positional relationship between the latest touch point and the initial touch point. On the premise that the slide operation is determined as the lateral slide operation, if the initial touch point is located on the left of the latest touch point, determination is made as the right slide operation; and if the initial touch point is located on the right of the latest touch point, determination is made as the left slide operation. In some embodiments, when whether the initial touch point is located on the left or the right of the latest touch point, the screen coordinates of the two touch points may be acquired respectively; and determination is made according to a size relationship between horizontal coordinates of the screen coordinates of the two touch points. The size relationship needs to be determined according to an origin position of a screen coordinate system and a positive direction of a horizontal axis, which will not be described in detail herein.

Figure 3:
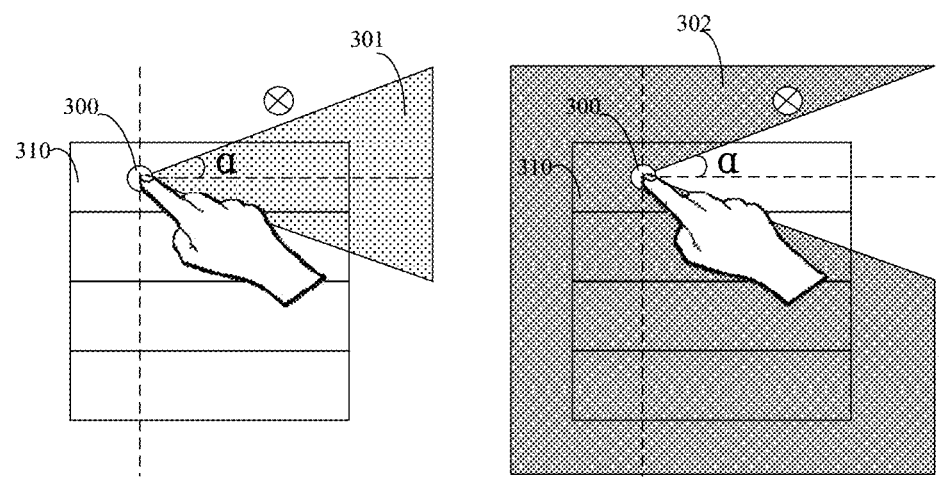
FIG. 3 is a schematic illustration of a principle of a slide operation according to some embodiments.

FIG. 3 is a schematic diagram of a principle of a slide operation according to some embodiments. As shown in FIG. 3, the following description is given by assuming that the first target condition is that the slide operation is the right slide operation, a shaded portion 301 on the left side shows region division of the right slide operation, and a shaded portion 302 on the right side shows region division of the longitudinal slide operation (and the left slide operation). It can be seen that when the slide direction of the slide operation triggered by the user's finger is within the target angle range $[-\alpha, \alpha]$ shown by the shaded portion 301, and the operation start point of the slide operation is located on the left of the operation ending point, in other words, when the user's finger is dragged from a touch point 300 to the shaded portion 301, it is determined that the slide operation is the right slide operation, that is, the slide operation meets the first target condition, it is triggered to display the first target region, and at this time, an interactive option 310 may present the effect of being dragged by the user's finger. Otherwise, when the slide direction of the slide operation triggered by the user's finger is within the angle range shown by the shaded portion 302, in other words, when the user's finger is dragged from the touch point 300 to the shaded portion 302, it is determined that a function of sliding to browse the virtual props list is triggered, and at this time, the interactive option 310 does not present the effect of being dragged by the user's finger.

In some embodiments, the terminal displays the first target region in the virtual scene on the right of the virtual prop list when displaying the first target region in the case that the slide operation meets the first target condition. That is, the first target region is located on the right of the virtual prop list, in some embodiments, the first target region is a rectangular region, and a height of the rectangular region is the same as that of the virtual prop list, so that a relatively neat and beautiful visual effect can be achieved. In some embodiments, the first target region can also be a circular region, a diamond region, an irregular region, etc., and the embodiments of the disclosure do not specifically limit a shape of the first target region. In some embodiments, the first target region is located on the left of the virtual prop list, or above the virtual prop list, or below the virtual prop list, or at any position (for example, the upper edge, the side edge, the center, etc.) in the virtual scene. The position of the first target region is not limited herein.

In some embodiments, a display position of the first target region has a corresponding relationship with an operation type of the slide operation indicated by the first target condition, for example, if the first target condition is that the slide operation is the left slide operation, the first target region is located on the left of the virtual prop list; or if the first target condition is that the slide operation is the right slide operation, the first target region is located on the right of the virtual prop list, so that the complexity of the user operation can be reduced. After sliding in a certain direction and triggering a designated type of slide operation, the user can continue to slide in this direction naturally into the first target region, so as to facilitate the user to quickly drag the interactive option to the first target region, and improve the human-computer interaction efficiency.

In some embodiments, the display position of the first target region does not have the corresponding relationship with the operation type of the slide operation indicated by the first target condition, for example, if the first target condition is that the slide operation is the left slide operation, the first target region is located on the right of the virtual prop list. Therefore, even if the user accidentally performs the left slide operation on the interactive option due to a false touch operation, since it is needed to drag the interactive option to the first target region on the right around the virtual prop list for marking the virtual prop, marking of the target virtual prop can be abandoned only needing to release the interactive option as soon as possible, thereby further reducing the false touch probability.

In some embodiments, since the process of the user performing the slide operation on the interactive option is a process of continuously moving the interactive option with holding down, the terminal can achieve the more intuitive and interesting visual effect and improve the human-computer interaction efficiency by presenting that the interactive option is "dragged" out of the virtual prop list by the user's finger and moves along the slide trajectory of the user's finger.

In some embodiments, the terminal responds to the slide operation on the interactive option for the target virtual prop; and in the virtual scene, the interactive option for the target virtual prop is displayed to move along the slide trajectory of the slide operation; and in the case that the interactive option for the target virtual prop reaches the operation end point of the slide operation, the interactive option for the target virtual prop is displayed to return to the operation start point of the slide operation.

In some embodiments, the terminal determines the relative position of the operation start point of the slide operation in the entire interactive option; in the process of displaying movement of the interactive option, the entire interactive option is displayed to translate along the slide trajectory with the operation start point as a start point; and during translation, the relative position of the touch point of the slide operation and the entire interactive option at each moment is ensured to be unchanged.

In some embodiments, when the interactive option reaches the operation end point of the slide operation, the interactive option is displayed to move back to the operation start point instantaneously, and it can save processing resources of the terminal; or the process of gradually moving the interactive option from the operation end point to the operation start point is displayed, and it can avoid the interactive option to return to the operation start point abruptly, so that the better visual effect is achieved; or the animation (or special effects, dynamic effects, etc.) of the interactive option flying back to the operation start point is played, and it can optimize the display effect of the terminal and enrich a display mode. For example, when the interactive option reaches the operation end point, the played animation is that the interactive option flies back to the operation start point after a small amount of shaking, thereby making the entire slide process more interesting.

Figure 4:
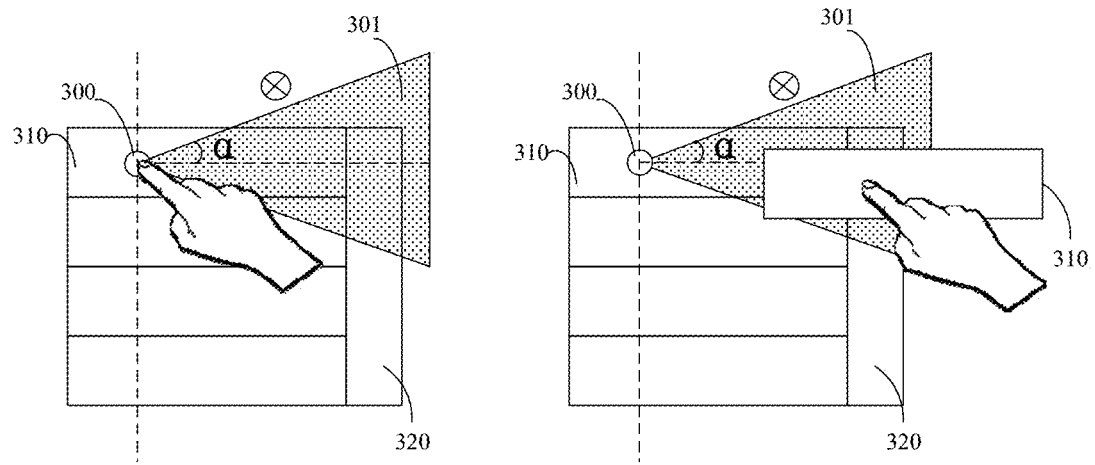
FIG. 4 is a schematic diagram of a principle of dragging an interactive option according to some embodiments.

FIG. 4 is a schematic diagram of a principle of dragging an interactive option according to some embodiments. Taking the first target condition that the slide operation is the right slide operation as an example to explain, as shown on the left side of FIG. 4, if the slide operation triggered by the user's finger is the right slide operation, that is, if the user's finger starts to drag the interactive option 310 from a touch point 300 to the shaded portion 301, it is explained that the slide operation is the right slide operation, that is, the slide operation meets the first target condition; and it is triggered to display the first target region 320 on the right of the virtual prop list, where the height of the first target region 320 is equal to that of the virtual prop list. Then, as the user's finger starts to slide from the touch point 300 towards the shaded portion 301 and continues to slide from the contact point in the shaded portion 301 into the first target region 320; and at this time, the visual effect that the interactive option 310 also moves as being dragged into the first target region 320 by the user's finger can be presented on the terminal screen, as shown on the right side of FIG. 4, that is, the process that the interactive option 310 moves along the slide trajectory of the slide operation is displayed.

Operation 203, the terminal distinctively displays the target virtual prop in the virtual scene in response to the operation end point of the slide operation being within the first target region.

In some embodiments, if the terminal continuously detects the touch operation of the user's finger on the terminal screen via the touch sensor, until the user releases a hand, that is, the touch sensor does not detect the touch operation any more, a touch point when the user releases the hand serves as the operation end point which represents the end point of the slide trajectory of the slide operation; then, the terminal determines the screen coordinate of the operation end point, and detects whether the screen coordinate of the operation end point is within a first target region; and in the case that the screen coordinate of the operation end point is within the first target region, an operation of distinctively displaying the target virtual prop executed; and in the case that the screen coordinate of the operation end point is not within the first target region, then the flow is exited.

In some embodiments, that the terminal distinctively displays the target virtual prop refers to that: the interactive option for the target virtual prop is displayed in the virtual prop list otherwise than display modes of other virtual props, that is, the interactive option for the target virtual prop is distinctively displayed in the virtual prop list; or, the prop model for the target virtual prop is displayed in the virtual scene otherwise than display modes of other virtual props, that is, the prop model for the target virtual prop itself is distinctively displayed in the virtual scene; or the interactive option is distinctively displayed in the virtual prop list, and the prop model is also distinctively displayed in the virtual scene. The embodiments of the disclosure do not specifically limit the distinctive display mode.

In some embodiments, the terminal distinctively displays the interactive option for the target virtual prop in the virtual prop list. In the above-mentioned process, by distinctively displaying the interactive option in the virtual prop list, when picking up or selecting the props, the controlled virtual object or each friend virtual object can clearly view which props are marked by self or team members through the virtual prop list at a glance; and in the case of marking a virtual prop with a strong auxiliary function or attack function, self-confrontation and team cooperation are facilitated, and the human-computer interaction efficiency is improved.

In some embodiments, the terminal changes a color of the interactive option, so that the color of the interactive option is different from colors of other interactive options. For example, each interactive option in the virtual prop list originally has a black background; and during distinctive displaying, the interactive option is modified to have a white background or a colored background (such as a red background, a green background, etc.). The color of the interactive option is not limited herein.

In some embodiments, the terminal modifies a transparency of the interactive option, so that the transparency of the interactive option is greater than transparencies of other interactive options, so that the interactive option can be highlighted in the virtual props list. For example, the transparency of each interactive option in the virtual props list is originally 50%, and the transparency of the interactive option is modified to 100% (or 80%, 90%, etc.) during distinctive displaying. The transparency of the interactive option is not limited herein.

In some embodiments, the terminal displays a target icon on the interactive option; the target icon is used for indicating that the target virtual prop is specially marked, and may be in any form, for example, the target icon is a green circular icon; and of course, the target icon can also be set in other colors or shapes. The embodiments of the disclosure do not specifically limit a display mode of the target icon. In some embodiments, the terminal displays the target icon at any position of the interactive option, for example, the target icon is displayed at the upper right corner of the interactive option, or at the upper left corner of the interactive option. The display position of the target icon is not limited herein.

In some embodiments, the terminal highlights the edge of the interactive option, so that the edge of the interactive option has a special light-emitting effect, and then the interactive option is highlighted in the virtual prop list and presents a visual effect of adding "special crispening effect" to the interactive option. For example, the edge of the interactive option is highlighted in blue, so that the edge of the interactive option has a special blue light effect; and of course, light-emitting effects of other colors can also be added. The color of the light-emitting effect is not limited herein.

In some embodiments, in addition to the above-mentioned color modification, transparency modification, target icon display and edge highlighting display, the terminal can further play a marked animation on the interactive option, or display text prompt information "marked with a XXX (a nickname of the controlled virtual object)" on the interactive option, etc.; and the distinctive display mode of the interactive option is not limited herein.

In some embodiments, the terminal displays a mark graphic on the prop model for the target virtual prop displayed in the virtual scene. Since the virtual props list is only a menu bar for facilitating an overview of various virtual props, and the prop models for various virtual props are also displayed in the virtual scene. In some embodiments, a 2D prop model is displayed in a 2D virtual scene, and a 3D prop model is displayed in a 3D virtual scene. The embodiments of the disclosure do not specifically limit dimensions of the virtual scene or the prop model. After the target virtual prop is marked through the slide operation, in addition to distinctively displaying the interactive option for the target virtual prop in the virtual prop list, the prop model for the target virtual prop can also be distinctively displayed in the virtual scene, so that the display effect of the marked target virtual prop is more intuitive; and whether the user views the virtual prop list or the prop model, the marked target virtual prop can be quickly noticed, which is convenient for deciding an interaction strategy how to use the target virtual prop for confrontation, and improves the human-computer interaction efficiency.

In some embodiments, the mark graphic is used for indicating that the target virtual prop is specially marked, and is in any form. For example, the mark graphic is a circular buoy, and a prop picture of the target virtual prop is displayed in the center of the circular buoy. Of course, the mark graphic can further be provided in other display forms, for example, is set as a red buoy in an exclamation mark shape, etc. The display mode of the mark graphic is not limited herein.

In some embodiments, the terminal displays the mark graphic at the periphery of the prop model for the target virtual prop, for example, the mark graphic is displayed at a pre-set height above the prop model for the target virtual prop, and the pre-set height is any numerical value greater than or equal to 0. Or the terminal displays the mark graphic at any position at the periphery of the prop model, for example, the mark graphic is displayed in the center, on the left side, on the right side, at the bottom, etc. of the prop model. The displaying position of the mark graphic is not limited herein.

In some embodiments, some prompt information is also displayed at the periphery of the mark graphic, including, but not limited to: a prop name of the target virtual prop, a nickname, added to the target virtual prop as a mark, of the controlled virtual object, a current distance between the target virtual prop and the controlled virtual object, etc. The periphery of the mark graphic is not limited herein.

In some embodiments, the mark graphic is displayed only on the terminal marking the target virtual prop, so that the mark graphic displayed on the prop model can be seen in the field of view of the controlled virtual object. In some embodiments, this mark graphic can further be synchronized to a terminal corresponding to each friend virtual object belonging to the same camp or team as the controlled virtual object via the server, so that the terminal corresponding to each friend virtual object can also display the mark graphic on the prop model for the target virtual prop. In other words, the mark graphic displayed on the prop model can also be seen in the field of view of each friend virtual object. Stated in another way, the mark graphic is visible in the fields of view of both the controlled virtual object and each friend virtual object, and each friend virtual object and the controlled virtual object are on the same team or in the same camp.

In some embodiments, during information synchronization, in the case that the operation end point of the slide operation is within the first target region, the terminal sends a prop marking instruction to the server, where the prop marking instruction at least carries a prop identification (ID) for the target virtual prop and an object ID for controlled virtual object; and in addition, the prop marking instruction can further carry an end time of the slide operation, etc. After receiving the prop marking instruction, the server sends the prop marking instruction to the terminal corresponding to each friend virtual object of the controlled virtual object; and after receiving the prop marking instruction, the terminal corresponding to each friend virtual object also distinctively displays the target virtual prop in the virtual scene. The distinctively display mode is similar to that the present terminal, and will not be described in detail here.

In some embodiments, the terminal displays the mark prompt information in the virtual scene, and the mark prompt information is used for prompting the controlled virtual object to mark the target virtual prop. Therefore, more intuitive interactive feedback can be given to the user who manipulates the controlled virtual object, and the human-computer interaction efficiency is improved. In some embodiments, the mark prompt information is that "the controlled virtual object marks the target virtual prop", or has other prompt contents. The embodiments of the disclosure do not specifically limit the text content of the mark prompt information.

In some embodiments, similar to the feature that the mark graphic can be synchronized to the terminal corresponding to each friend virtual object via the server, the mark prompt information can also be synchronized to the terminal corresponding to each friend virtual object via the server. That is to say, the mark prompt information is visible in the field of view of both the controlled virtual object and each friend virtual object; and each friend virtual object and the controlled virtual object are on the same team or in the same camp. The synchronization mode of the mark prompt information is similar to that of the mark graphic, and will not be described in detail here.

All above-mentioned alternatives can be combined in any combination to form alternative embodiments of the present disclosure, which will not be described in detail herein.

In the method provided by the embodiments of the disclosure, by providing a novel human-computer interaction mode of marking the virtual prop, when it is detected that the user performs the slide operation on the interactive option for the target virtual prop in the virtual prop list, the first target region is displayed; and when the user drags the interactive option to the first target region, it is considered that the target virtual prop is marked, and the target virtual prop is distinctively displayed. Compared with the mode of adding the mark button on the right of the interactive option of each virtual prop in the virtual prop list, since in this solution, it is needed to drag the interactive option to the first target region to complete marking, the false touch rate of user operation is greatly reduced, the operation mode is simple, convenient and rapid, and then the human-computer interaction efficiency can be improved.

Figure 5:
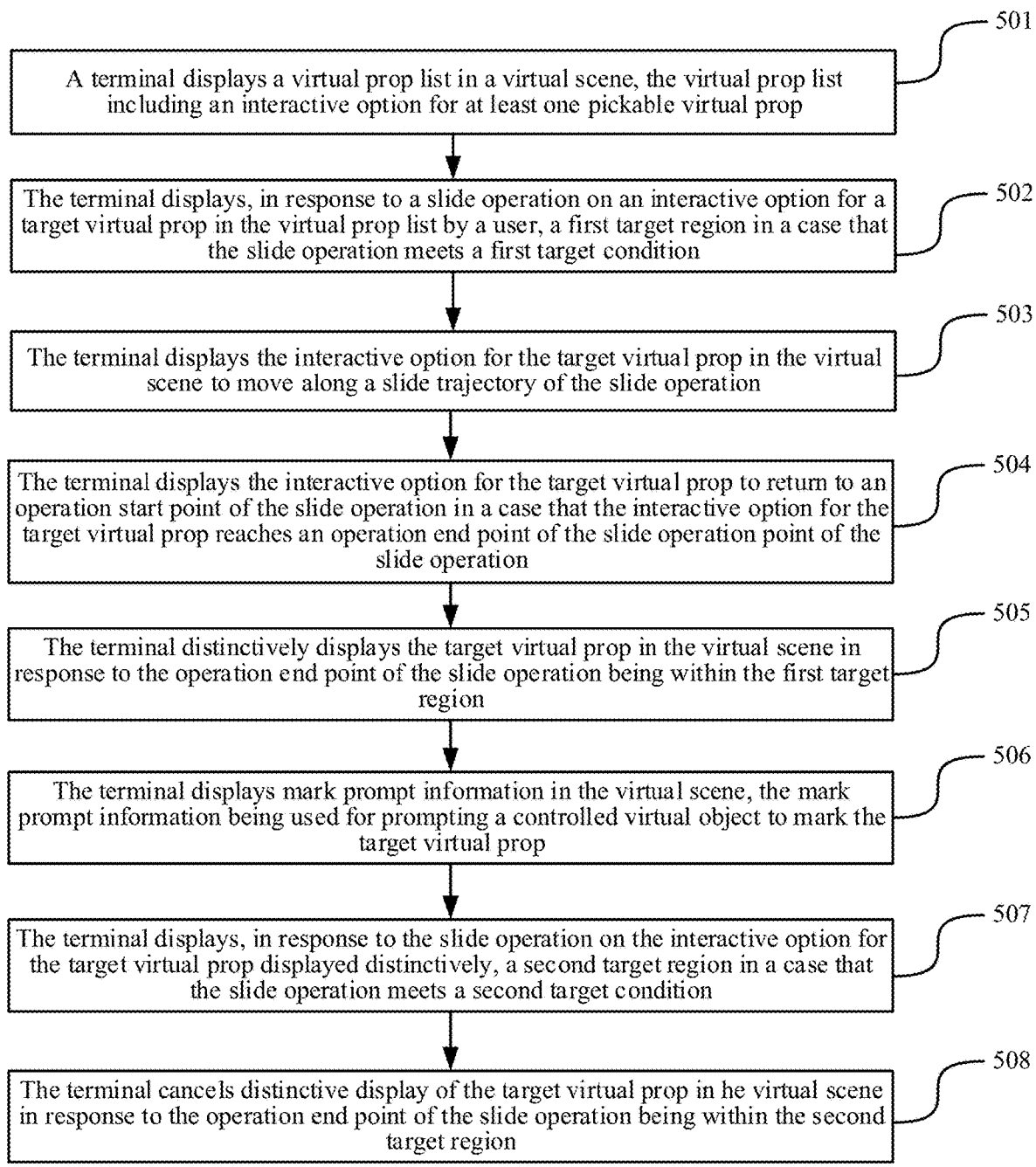
FIG. 5 is a flowchart of a display method for a virtual prop according to some embodiments.

FIG. 5 is a flowchart of a display method for a virtual prop according to some embodiments. With reference to FIG. 5, the embodiment is executed by the electronic device, and the following description is given by taking the electronic device as the terminal, for example, the terminal is the first terminal 120 or the second terminal 160 shown in FIG. 1, and the embodiment includes the following operations.

Operation 501, a terminal displays a virtual prop list in the virtual scene, where the virtual prop list includes an interactive option for at least one pickable or selectable virtual prop.

The above-mentioned operation 501 is similar to the above-mentioned operation 201, and will not be described in detail here.

Operation 502, the terminal responds to a slide operation on the interactive option for the target virtual prop in the virtual prop list by a user; and if the slide operation meets a first target condition, a first target region is displayed in the virtual scene.

The above-mentioned operation 502 is similar to the above-mentioned operation 202, and will not be described in detail here.

Operation 503, the terminal displays the interactive option for the target virtual prop in the virtual scene to move along a slide trajectory of the slide operation.

In some embodiments, the terminal determines relative position of an operation start point of the slide operation in the entire interactive option; in the process of displaying movement of the interactive option, the entire interactive option is displayed to translate along the slide trajectory with the operation start point as a start point; and during translation, the relative position of a touch point of the slide operation and the entire interactive option at each moment is ensured to be unchanged.

Operation 504, if the interactive option for the target virtual prop reaches the operation end point of the slide operation, the terminal displays the interactive option for the target virtual prop to return to the operation start point of the slide operation.

In some embodiments, if the terminal continuously detects a touch operation of the user's finger on the terminal screen via the touch sensor, until the user releases a hand, that is, the touch sensor does not detect the touch operation any more, a touch point when the user releases the hand serves as the operation end point which represents the end point of the slide trajectory of the slide operation.

In some embodiments, when the interactive option reaches the operation end point of the slide operation, the interactive option is displayed to move back to the operation start point instantaneously, and it can save processing resources of the terminal; or the animation (or special effects, dynamic effects, etc.) of the interactive option flying back to the operation start point is played, and it can optimize the display effect of the terminal and enrich a display mode. For example, when the interactive option reaches the operation end point, the played animation is that the interactive option flies back to the operation start point after a small amount of shaking, thereby making the entire slide process more interesting.

In the above-mentioned operations 503-504, since the process of the user performing the slide operation on the interactive option is a process of continuously moving an interactive button with holding down, the terminal, through the above-mentioned operations 503-504, can present a visual effect that the interactive option is "dragged" out of the virtual prop list by the user's finger and moves along a slide trajectory of the user's finger. This visual effect is more intuitive and highly interesting, and can be organically combined with an interaction operation, that is, the slide operation, sent by the user to improve the human-computer interaction efficiency.

Operation 505, the terminal distinctively displays the target virtual prop in the virtual scene in response to the operation end point of the slide operation being within the first target region.

The above-mentioned operation 505 is similar to the above-mentioned operation 203, and will not be described in detail here.

Figure 6:
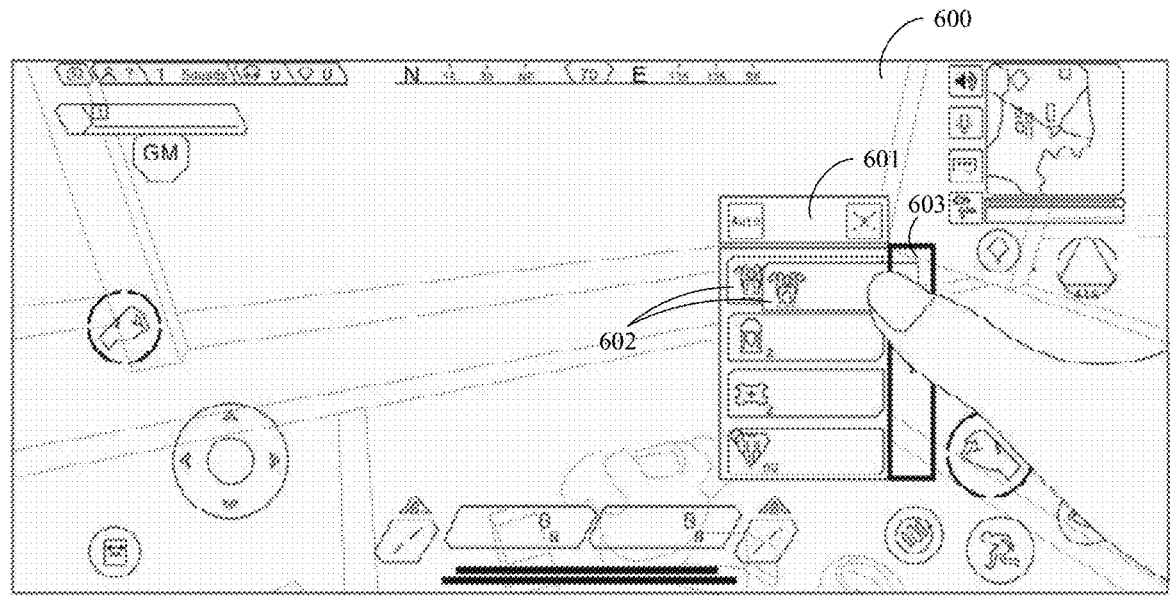
FIG. 6 is a schematic diagram of an interface of a first target region according to some embodiments.

FIG. 6 is a schematic diagram of an interface of a first target region according to some embodiments. As shown in FIG. 6, a virtual prop list 601 is displayed in a virtual scene 600; if a user performs a slide operation on an interactive option 602 for a target virtual prop, a terminal displays a first target region 603 in the virtual scene 600; and if the user drags the interactive option 602 to the first target region 603, that is, if an operation end point is within the first target region 603, the terminal is triggered to distinctively display the target virtual prop.

Operation 506, the terminal displays mark prompt information in the virtual scene, where the mark prompt information is used for prompting the controlled virtual object to mark the target virtual prop.

In some embodiments, the mark prompt information is that "the controlled virtual object marks the target virtual prop", or has other prompt contents. The embodiments of this application do not specifically limit the text content of the mark prompt information.

In some embodiments, the terminal displays the mark prompt information at any position in the virtual scene, for example, the mark prompt information on the left of a minimap control is displayed in the virtual scene; or the mark prompt information is displayed at the center position of the virtual scene; or the mark prompt information is displayed above the virtual prop list; or the mark prompt information is displayed above a prop model for the target virtual prop.

In the above-mentioned process, by displaying the mark prompt information in the virtual scene, a more intuitive interactive feedback can be given to the user who manipulates the controlled virtual object, and the human-computer interaction efficiency is improved. In some embodiments, since continuous display of the mark prompt information may obstruct the field of view of the controlled virtual object and cause damage on game experience of the user, after the mark prompt information is displayed for a time reaching a display time threshold, the mark prompt information is not displayed any more, where the display time threshold is any numerical value greater than 0, for example, 3 seconds, 5 seconds, etc. Therefore, the mark prompt information can be avoided from obstructing the field of view of the controlled virtual object for a long time; and the user experience can be further optimized on the basis of providing interactive feedback on the slide operation.

In some embodiments, the mark prompt information is scrolled in a manner similar to a rolling word screen, for example, after the mark prompt information is displayed on the left of the minimap control, the dynamic effect of the mark prompt information scrolling upward is played until the mark prompt information exits the terminal screen, so that the effect of greying out the mark prompt information is more interesting; and the visual effect is more smooth.

In some embodiments, the mark prompt information is displayed only on the terminal corresponding to the controlled virtual object marked with the target virtual prop, so that the mark graphic displayed on the prop model can be viewed within the field of view of the controlled virtual object. In some embodiments, this mark prompt information can also be synchronized to the terminal corresponding to each friend virtual object belonging to the same camp or team as the controlled virtual object via the server, so that the terminal corresponding to each friend virtual object can also display the mark prompt information, that is, the mark prompt information can also be seen in the field of view of each friend virtual object. In other words, the mark prompt information is visible in the fields of view of the controlled virtual object and each friend virtual object, and each friend virtual object and the controlled virtual object are on the same team or in the same camp.

In some embodiments, during information synchronization, in the case that the operation end point of the slide operation is within the first target region, the terminal sends a prop marking instruction to the server, where the prop marking instruction at least carries a prop identification (ID) for the target virtual prop and an object ID for controlled virtual object; and in addition, the prop marking instruction can further carry an end time of the slide operation, etc. After receiving the prop marking instruction, the server sends the prop marking instruction to the terminal corresponding to each friend virtual object of the controlled virtual object; and after receiving the prop marking instruction, the terminal corresponding to each friend virtual object also distinctively displays the target virtual prop in the virtual scene, and corresponding mark prompt information is generated and displayed in the virtual scene.

Figure 7:
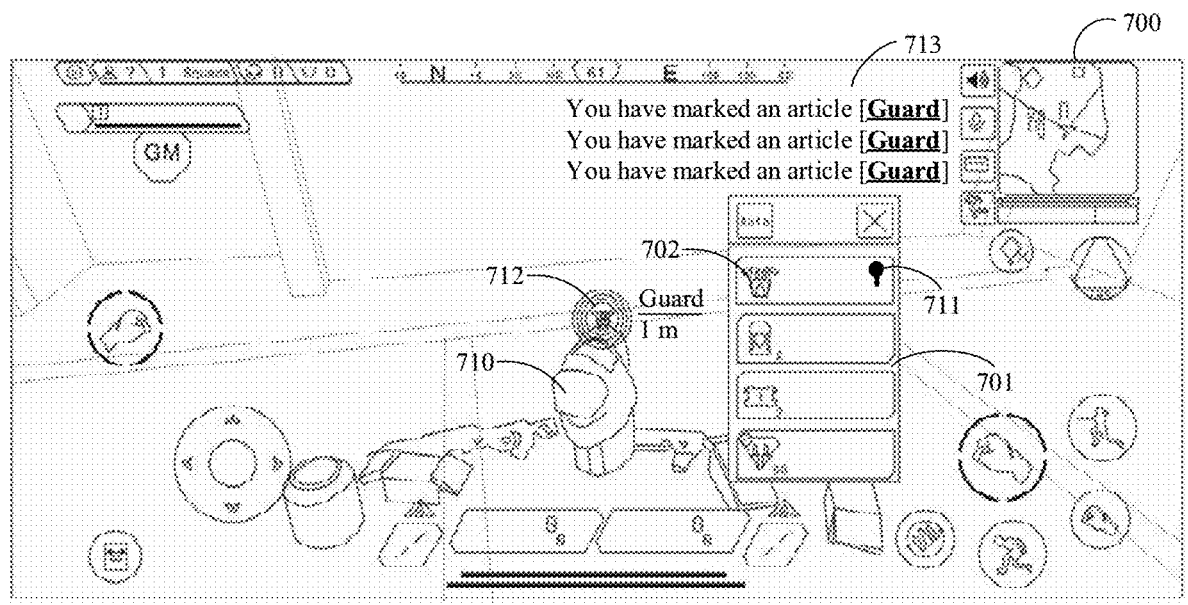
FIG. 7 is a schematic diagram of an interface of distinctively displaying a target virtual prop according to some embodiments.

FIG. 7 is a schematic diagram of an interface of a distinctively displaying, and marking, a target virtual prop according to some embodiments. As shown in FIG. 7, a virtual prop list 701 is displayed in a virtual scene 700; and after the user drags an interactive option 702 for the target virtual prop to a first target region, a terminal can distinctively display the target virtual prop. First, a target icon 711 is displayed on the interactive option 702, and is used for indicating that the target virtual prop is specially marked; and second, a mark graphic 712 is displayed on a prop model 710 for the target virtual prop, a current distance between the target virtual prop and the controlled virtual object is displayed as "1 m" on the right of the mark graphic 712. In addition, mark prompt information 713 is displayed on the left of the minimap control, and can prompt the controlled virtual object in a text manner to specially mark the target virtual prop. In some embodiments, the target icon 711, the mark graphic 712, and the mark prompt information 713 are all visible to the user self and teammates.

Figure 8:
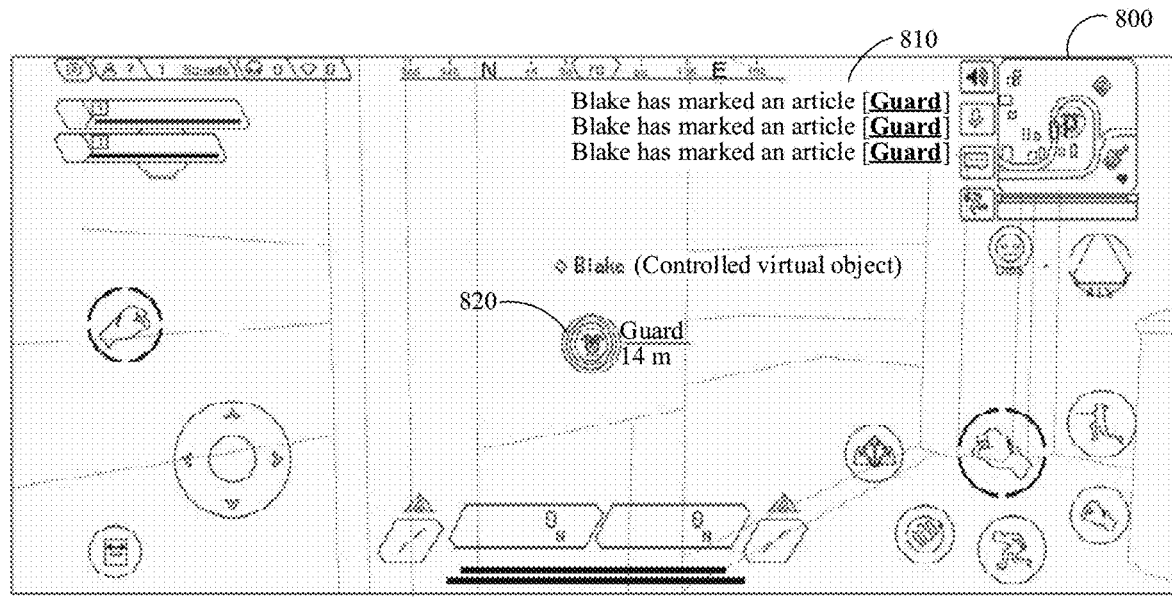
FIG. 8 is a schematic diagram of an interface in a field of view of a friend virtual object provided in an embodiment of this application.

In an exemplary scene, in a case that both the mark graphic and the mark prompt information are visible to the user self and the teammates. FIG. 8 is a schematic diagram of an interface in a field of view of a friend virtual object according to some embodiments. As shown in FIG. 8, it shows a virtual scene in the field of view of the friend virtual object. In the field of view of the friend virtual object, mark prompt information 810 is displayed in a virtual scene 800, prompting the controlled virtual object to specially mark the target virtual prop, and a mark graphic 820 is also displayed on the prop model for the target virtual prop. As shown in FIG. 8, even if the prop model for the target virtual prop is blocked by a wall, the position of the target virtual prop can be clearly located through the mark graphic 820, thereby achieving a more intuitive display effect, facilitating the friend virtual object to search for and pick up or select the target virtual prop in the virtual scene, and improving the human-computer interaction efficiency.

Operation 507, the terminal responds to the slide operation on the interactive option of distinctively displaying the target virtual prop; and if the slide operation meets a second target condition, a second target region is displayed in the virtual scene.

In some embodiments, the second target condition is the same as the first target condition, so that the same operation mode is adopted for the marking operation and the mark cancelling operation on the virtual prop; or the second target condition is different from the first target condition, so that the different operation modes are adopted for the marking operation and the mark cancelling operation on the virtual prop. The embodiments of the disclosure do not specifically limit whether the second target condition is the same as the first target condition.

The following description is given in the case that the second target condition is the same as the first target condition, for example, the first target condition includes that the slide operation is the lateral slide operation, and then the second target condition also includes that the slide operation is the lateral slide operation. In the case that the target virtual prop has been marked, if the user performs the lateral slide operation again on the interactive option for the target virtual prop, it represents that the slide operation on the interactive option meets the second target condition, and the operation on the second target region is performed. It is to be noted that a manner of determining whether the slide operation is the lateral slide operation is similar to above-mentioned operation 202, and will not be described in detail herein.

In some embodiments, since the lateral slide operation only defines that the user slides the interactive option laterally, the lateral slide operation is also specifically divided into a left slide operation and a right slide operation. In some embodiments, if the first target condition is that the slide operation is the right slide operation, the second target condition is that the slide operation is the left slide operation, so as to provide a human-computer interaction mode of "marking with a right slide and mark cancelling with a left slide". In some embodiments, both the first target condition and the second target condition are that the slide operation is the right slide operation, so as to provide a human-computer interaction mode of "marking with a right slide and mark cancelling with once more right slide". In some embodiments, if the first target condition is that the slide operation is the left slide operation, the second target condition is that the slide operation is the right slide operation, so as to provide a human-computer interaction mode of "marking with the left slide and mark cancelling with the right slide". In some embodiments, both the first target condition and the second target condition are that the slide operation is the left slide operation, so as to provide a human-computer interaction mode of "marking with a left slide and mark cancelling with once more left slide". The embodiments of the disclosure do not specifically limit thereto. It is to be noted that the manner of determining whether the lateral slide operation is the left slide operation or the right slide operation is similar to above-mentioned operation 202, and will not be described in detail herein.

In the above-mentioned process, by configuring different first target conditions and different second target conditions, combination of the two can create a wide variety of human-computer interaction modes; and in addition to a default human-computer interaction mode in the server configuration, a user-defined human-computer interaction mode can also be provided to the terminal, so that the user configures a personalized human-computer interaction mode according to own operating habits.

In some embodiments, the terminal displays the second target region on the right of the virtual prop list when displaying the second target region in the case that the slide operation meets the second target condition. That is, the second target region is located on the right of the virtual prop list. In some embodiments, the second target region has the same size and position as the first target region, but has a different color from the first target region; or the second target region has a different size, position and color from the first target region. The embodiments of the disclosure do not specifically limit thereto.

In one example, the second target region is a rectangular region, and a height of the rectangular region is the same as that of the virtual prop list, so that a relatively neat and beautiful visual effect can be achieved. In some embodiments, the second target region can also be a circular region, a diamond region, an irregular region, etc., and the embodiments of the disclosure do not specifically limit a shape of the second target region.

In some embodiments, in addition to being located on the right of the virtual prop list, the second target region can also be located on the left of the virtual prop list, or above the virtual prop list, or below the virtual prop list, or at any position (for example, the upper edge, the side edge, the center, etc.) in the virtual scene. The embodiments of the disclosure do not specifically limit the position of the second target region.

In some embodiments, a display position of the second target region has a corresponding relationship with an operation type of the slide operation indicated by the second target condition, for example, if the second target condition is that the slide operation is the left slide operation, the second target region is located on the left of the virtual prop list; or if the second target condition is that the slide operation is the right slide operation, the second target region is located on the right of the virtual prop list, so that the complexity of the user operation can be reduced. After sliding in a certain direction and triggering a designated type of slide operation, the user can continue to slide in this direction naturally into the second target region, so as to facilitate the user to quickly drag the interactive option to the second target region, and improve the human-computer interaction efficiency.

In some embodiments, the display position of the second target region does not have the corresponding relationship with the operation type of the slide operation indicated by the second target condition, for example, if the second target condition is that the slide operation is the left slide operation, the second target region is located on the right of the virtual prop list. Therefore, even if the user accidentally performs the left slide operation on the interactive option due to a false touch operation, since it is needed to drag the interactive option to second first target region on the right around the virtual prop list for cancelling the mark on the virtual prop, cancelling of the mark on the target virtual prop can be abandoned only needing to release the interactive option as soon as possible, thereby further reducing the false touch probability.

Figure 9:
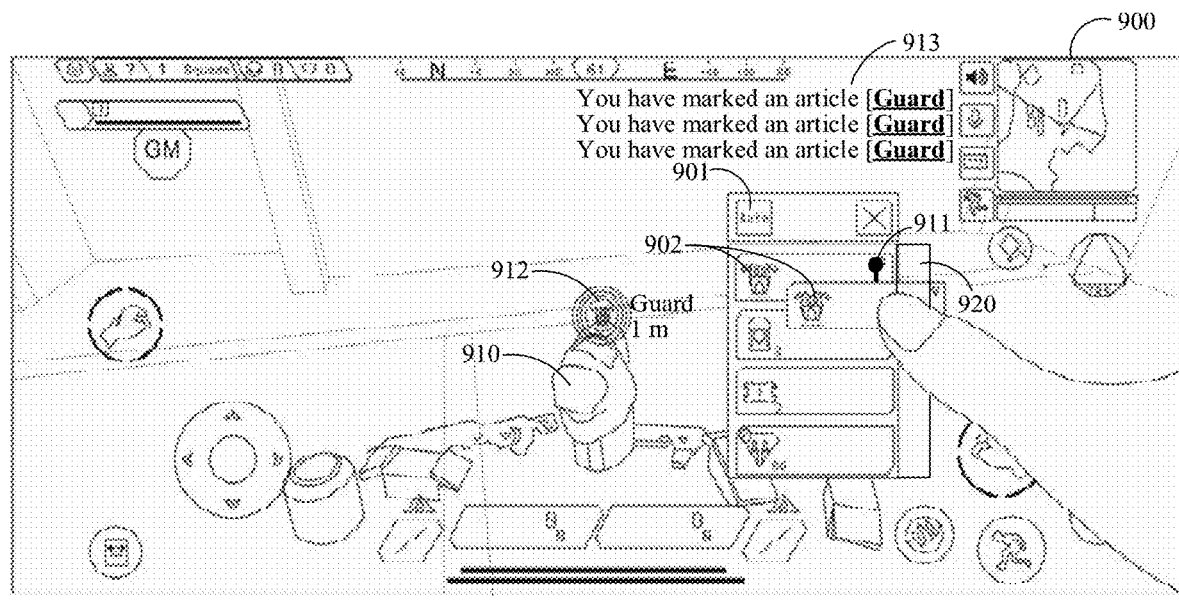
FIG. 9 is a schematic diagram of an interface of a second target region according to some embodiments.

FIG. 9 is a schematic diagram of an interface of a second target region according to some embodiments. As shown in FIG. 9, a virtual prop list 901 is displayed in a virtual scene 900, at this time, the user has completed a marking operation on a target virtual prop, and therefore, a target icon 911 is displayed on an interactive option 902 for the target virtual prop. A mark graphic 912 is displayed on a prop model 910 for the target virtual prop, and mark prompt information 913 is also displayed on the left of a minimap control. In this case, the user performs the slide operation on the interactive option 902 again, and the slide operation meets the second target condition (for example, the slide operation is the lateral slide operation); the terminal can display the second target region 920; and when the user drags the interactive option 902 to the second target region 920, that is, when the operation end point of the slide operation is within the second target region 920, distinctive display of the target virtual prop can be cancelled in the virtual scene, that is, display of the target icon 911, the mark graphic 912 and the mark prompt information 913 are cancelled.

Operation 508, the terminal cancels distinctive display of the target virtual prop in the virtual scene in response to the operation end point of the slide operation being within the second target region.

The manner of the terminal detecting whether the operation end point of the slide operation is within the second target region is similar to the above-described operation 203, and will not be described in detail herein.

In some embodiments, when the terminal cancels distinctive display of the target virtual prop, it refers to that the terminal does not distinctively display the target virtual prop any more, that is, a display mode, different from other virtual props, of the target virtual prop is restored to a same display mode as other virtual props.

In some embodiments, assuming that the interactive option for the target virtual prop is distinctively displayed in the virtual prop list in a marked state, after the mark is cancelled, distinctive display of the interactive option for the target virtual prop in the virtual prop list is cancelled, so that the display mode of the virtual scene can be restored to that before the target virtual prop is not marked.

In some embodiments, assuming that the prop model for the target virtual prop is distinctively displayed in the virtual scene in the marked state, for example, the mark graphic is displayed on the prop model for the target virtual property, after the marking is cancelled, the mark graphic is cancelled on the prop model for the target virtual prop, so that the display mode of the virtual scene can be restored to that before the target virtual prop is not marked.

In some embodiments, assuming that the mark prompt information is displayed in the virtual scene in the marked state, if the mark prompt information is still displayed in the virtual scene when the mark is cancelled, display of the mark prompt information is cancelled in the virtual scene after the mark is cancelled, so that the display mode of the virtual scene can be restored to that before the target virtual prop is not marked.

It is to be noted that if the operation of distinctively displaying the target virtual prop can be synchronized to the terminal of each friend virtual object, then the above-mentioned operation of cancelling the distinctive display of the target virtual prop also needs to be correspondingly synchronized to the terminal of each friend virtual object, so as to ensure information about various virtual objects in the same camp or on the same team to intercommunicate in time.

All above-mentioned alternatives can be combined in any combination to form alternative embodiments of the present disclosure, which will not be described in detail herein.

In the method provided by the embodiments of the disclosure, by providing a novel human-computer interaction mode of marking the virtual prop, when it is detected that the user performs the slide operation on the interactive option for the target virtual prop in the virtual prop list, the first target region is displayed; and when the user drags the interactive option to the first target region, it is considered that the target virtual prop is marked, and the target virtual prop is distinctively displayed. Compared with the mode of adding the mark button on the right of the interactive option of each virtual prop in the virtual prop list, since in this solution, it is needed to drag the interactive option to the first target region to complete marking, the false touch rate of user operation is greatly reduced, the operation mode is simple, convenient and rapid, and then the human-computer interaction efficiency can be improved.

Figure 10:
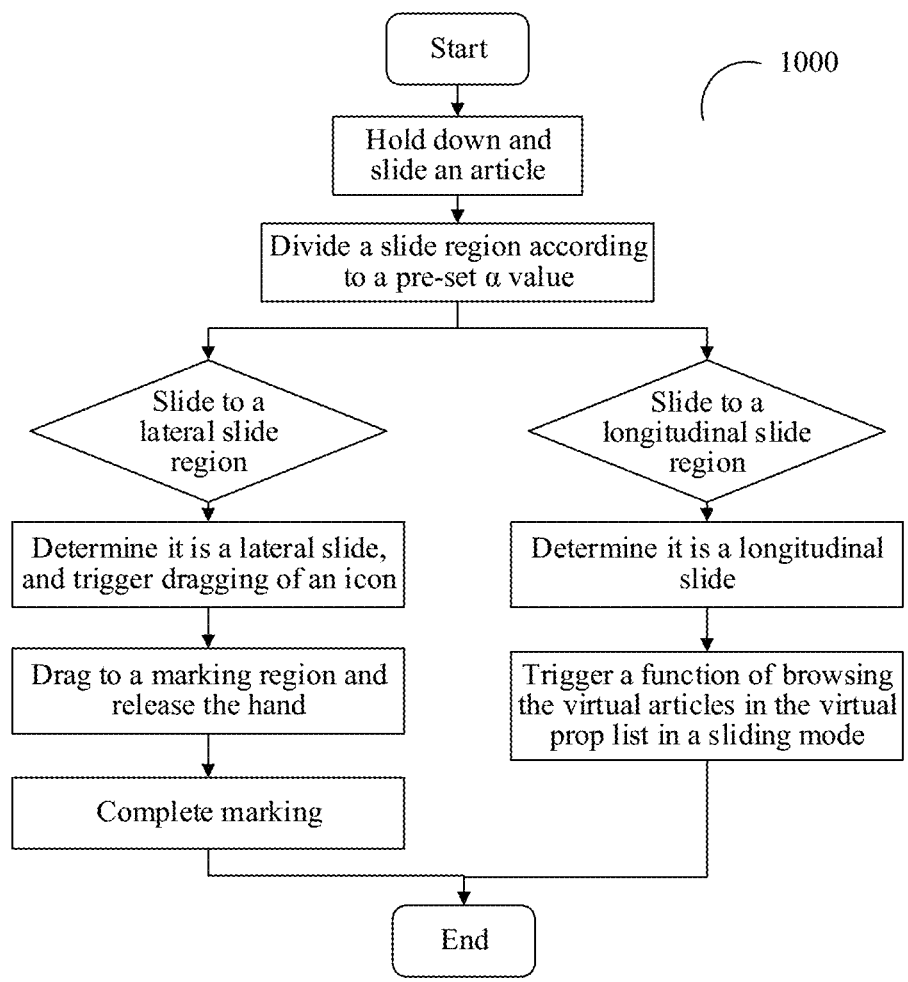
FIG. 10 is a principle flowchart of a display method for a virtual prop according to some embodiments.

FIG. 10 is a principle flowchart of a display method for a virtual prop according to some embodiments. As shown in 1000, the following description is given by taking a virtual prop as a virtual article, and at this time, a virtual prop list is also a virtual article list. This embodiment includes the following operations.

Operation 1, the user's finger holds down and slides the virtual article in the virtual article list.

Operation 2, the terminal divides a slide region according to a pre-set a value.

Operation 3, the terminal determines whether the user's finger slides to a lateral slide region or to a longitudinal slide region; if the user's finger slides to the lateral slide region, operations 4-6 are executed; and if the user's finger slides to the longitudinal slide region, operations 7-8 are executed.

Operation 4, the terminal determines it is the lateral slide operation, dragging an icon (that is, an interactive option) for the virtual article is triggered.

Operation 5, the user drags the icon to a marking region (that is, the first target region) and releases the hand.

Operation 6, the virtual article is marked.

Operation 7, the terminal determines it is the longitudinal slide operation.

Operation 8, the terminal triggers a function of browsing the virtual articles in the virtual prop list in a sliding mode.

In the embodiments of the disclosure, by specifying the angle α value, it can be intelligently distinguished whether the slide operation of a user's finger belongs to the lateral slide operation or the longitudinal slide operation. Therefore, with regard to a mobile end game providing the virtual article list, an operation dimension of dragging the icon for the virtual article is added; and at the same time, since the user needs to drag the icon to a specified region (that is, the first target region) to trigger a corresponding article marking function, which is equivalent to adding a secondary confirmation link of an article marking process, occurrence of a false touch situation is greatly reduced.

In some embodiments, the first target condition includes that the slide operation is the right slide operation; or, in some embodiments, the first target condition includes that the slide operation is the lateral slide operation, that is whether it is the left slide operation or the right slide operation, the slide operation can trigger display of the first target region to prompt the user to continue to drag the interactive option to the first target region and mark the target virtual prop.

Figure 11:
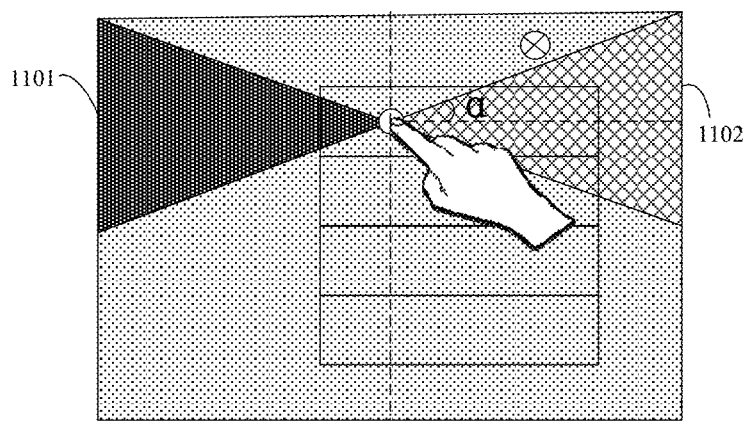
FIG. 11 is a schematic diagram of a principle of a lateral slide operation according to some embodiments.

FIG. 11 is a schematic diagram of a principle of a lateral slide operation according to some embodiments. As shown in 1100, it shows a region division via the lateral slide operations on two sides. Since the lateral slide operation includes both the left slide operation and the right slide operation, a left shaded portion 1101 is the region division for the left slide operation, and a right shaded portion 1102 is the region division for the right slide operation. In an exemplary scene, if the first target condition is set as the slide operation being the lateral slide operation, then the article marking function can be triggered by both the lateral slide operations on the two sides, that is, as long as the user's finger triggers the lateral slide operation (whether it is the left slide operation of sliding to the left shaded portion 1101 laterally or the right slide operation of sliding to the right shaded portion 1102 laterally), it can be triggered to display the first target region, so as to prompt the user to continue to drag the interactive option to the first target region and mark the target virtual prop.

In some embodiments, if it is detected that the slide operation meets the first target condition, a plurality of different target regions are displayed, and are used for providing different interaction functions; and at this time, the user can achieve the interaction functions corresponding to this target regions by dragging the interactive option to the different target regions, so that the expandability of this operation mode is greatly improved, and the operation mode has a higher availability and a wide range of application scenes.

Figure 12:
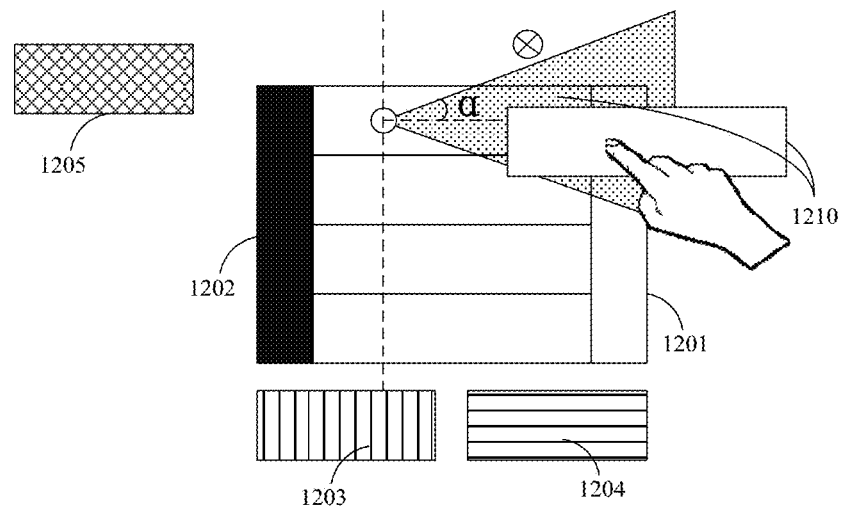
FIG. 12 is a schematic diagram of displaying a plurality of target regions according to some embodiments.

FIG. 12 is a schematic diagram of displaying a plurality of target regions according to some embodiments. As shown in FIG. 12, the following description is given by taking a target virtual prop as a target virtual article; and if the slide operation triggered by the user's finger on the interactive option for the target virtual article meets the first target condition, 5 different target regions are displayed, including a marking region 1201 (that is, the first target region), an immediate use region 1202, an instrument A installation region 1203, an instrument B installation region 1204 and a transmitting region 1205. The 5 different target regions can achieve 5 different interaction functions respectively. The marking region 1201 is configured to mark the target virtual article, and the user drags an icon 1210 for the target virtual article to the marking region 1201, which can trigger and complete marking of the target virtual article; the immediate use region 1202 is used for immediately using the target virtual article, and the user drags the icon 1210 for the target virtual article to the immediate use region 1202, which can trigger immediate use of the target virtual article; the instrument A installation region 1203 is configured to install the target virtual article of an accessory class on an instrument A, and the user drags the icon 1210 for the target virtual article to the instrument A installation region 1203, which can trigger installation of the target virtual article of the accessory class on the instrument A; the instrument B installation region 1204 is configured to install the target virtual article of the accessory class on the device B, and the user drags the icon 1210 of the target virtual article to the instrument B installation region 1204, which can trigger installation of the target virtual article of the accessory class on the instrument B; and the transmitting region 1205 is configured to transmit the target virtual article to the position where a specific teammate is located, and the user drags the icon 1210 for the target virtual article to the transmitting region 1205, which can trigger to immediately transmit the target virtual article to the position where the specified specific teammate is located.

As shown in FIG. 12, by displaying a plurality of different target regions and setting different interaction functions for the different target regions, the expandability of this human-computer interaction operation mode of dragging the icon for the virtual article is greatly improved, this operation mode has a higher availability and a wide range of application scenes.

Figure 13:
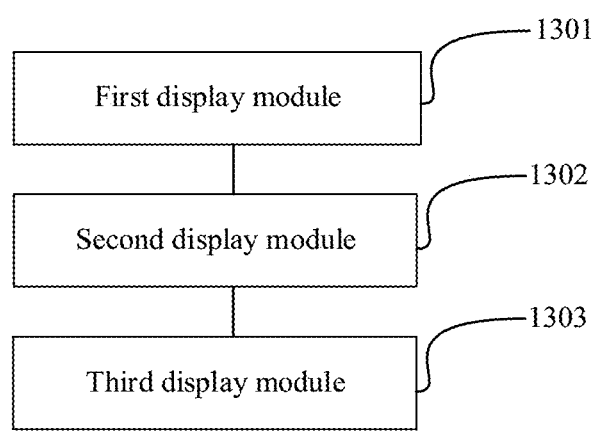
FIG. 13 is a schematic diagram of a structure of a display device for a virtual prop according to some embodiments.

FIG. 13 is a schematic diagram of a structure of a display device for a virtual prop according to some embodiments. As shown in FIG. 13, an apparatus includes:

a first display module 1301 configured to display a virtual prop list in a virtual scene, where the virtual prop list includes an interactive option for at least one pickable or selectable virtual prop;

a second display module 1302 configured to display, in response to a slide operation on the interactive option for the target virtual prop in the virtual prop list, a first target region in a case that the slide operation meets a first target condition; and a third display module 1303 configured to distinctively display the target virtual prop in a case that an operation end point of the slide operation is within the first target region.

For an apparatus provided by the embodiments of the disclosure, by providing a novel human-computer interaction mode of marking the virtual prop, when it is detected that the user performs the slide operation on the interactive option for the target virtual prop in the virtual prop list, the first target region is displayed; and when the user drags the interactive option to the first target region, it is considered that the target virtual prop is marked, and the target virtual prop is distinctively displayed. Compared with the mode of adding a mark button on the right of the interactive option for each virtual prop in the virtual prop list, since in this solution, it is needed to drag the interactive option to the first target region to complete marking, the false touch rate of user operation is greatly reduced, the operation mode is simple, convenient and rapid, and then the human-computer interaction efficiency can be improved.

In some embodiments, the first target condition includes: the slide operation is a lateral slide operation.

In some embodiments, an apparatus composition is shown based on FIG. 13, the apparatus includes: a determination module configured to determine that the slide operation is the lateral slide operation in a case that an included angle between a slide direction of the slide operation and a horizontal direction is within a target angle range.

In some embodiments, the second display module 1302 is configured to: display the first target region on the right of the virtual prop list.

In some embodiments, the third display module 1303 is configured to: distinctively display the interactive option for the target virtual prop in the virtual prop list.

In some embodiments, the third display module 1303 is configured to: display a mark graphic on a prop model for the target virtual prop.

In some embodiments, the mark graphic is visible in the fields of view of both the controlled virtual object and each friend virtual object which is on the same team or in the same camp as the controlled virtual object.

In some embodiments, an apparatus composition is shown based on FIG. 13, the apparatus includes: a fourth display module configured to display mark prompt information for prompting the controlled virtual object to mark the target virtual prop.

In some embodiments, the mark prompt information is visible in the fields of view of both the controlled virtual object and each friend virtual object which is on the same team or in the same camp as the controlled virtual object.

In some embodiments, the second display module 1302 is further configured to: display, in response to the slide operation on the interactive option for the target virtual prop displayed distinctively, a second target region in a case that the slide operation meets a second target condition. The third display module 1303 is also configured to: cancel distinctive display of the target virtual prop in a case that the operation end point of the slide operation is within the second target region.

In some embodiments, an apparatus composition is shown based on FIG. 13, the apparatus includes: A fifth display module configured to display, in response to the slide operation on the interactive option for the target virtual prop, the interactive option for the target virtual prop to move along a slide trajectory of the slide operation. The fifth display module is also configured to display the interactive option for the target virtual prop to return to the operation start point of the slide operation in the case that the interactive option for the target virtual prop reaches the operation end point of the slide operation.

All above-mentioned alternatives can be combined in any combination to form alternative embodiments of the present disclosure, which will not be described in detail herein.

It is to be noted that when the display apparatus for the virtual prop provided by the above-mentioned embodiments display the virtual prop, division of the foregoing function modules is merely used as an example for description. In practical applications, based on a requirement, the foregoing functions can be allocated to and completed by different function modules. That is, an internal structure of the electronic device is divided into different function modules, to complete all or some of the functions described above. In addition, the display apparatus for the virtual prop provided by the above-mentioned embodiments belongs to the same concept as the embodiment of the display method for the virtual prop, and the specific implementation process thereof is described in detail in the embodiments of the display method for the virtual prop, which will not be described in detail here.

Figure 14:
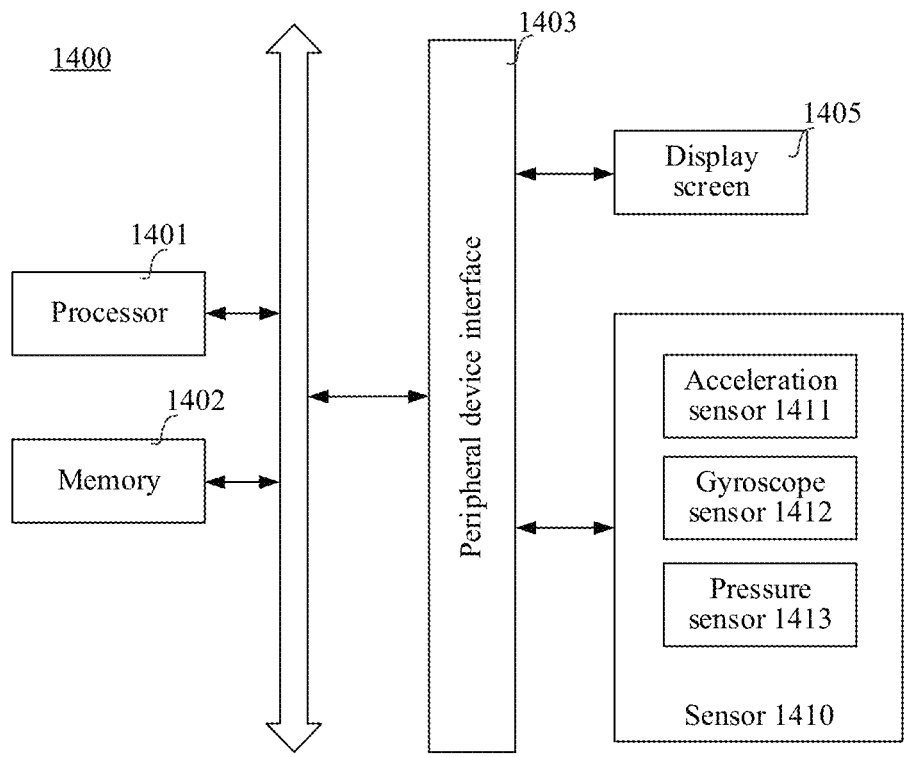
FIG. 14 is a schematic diagram of a structure of an electronic device according to some embodiments.

FIG. 14 is a schematic diagram of a structure of an electronic device according to some embodiments. As shown in FIG. 14, the electronic device is exemplified as a terminal 1400. In some embodiments, the device types of the terminal 1400 include: a smart phone, a tablet computer, a moving picture experts group audio layer III (MP3) player, a moving picture experts group audio layer IV (MP4) player, a notebook computer, a desktop computer. The terminal 1400 may also be referred to as another name such as a user device, a portable terminal, a laptop terminal, or a desktop terminal.

Generally, the terminal 1400 includes: a processor 1401 and a memory 1402.

In some embodiments, the processor 1401 includes one or more processing cores, for example, a 4-core processor or an 8-core processor. In some embodiments, the processor 1401 is implemented in at least one of hardware forms of digital signal processing (DSP), a field-programmable gate array (FPGA) and a programmable logic array (PLA). In some embodiments, the processor 1401 includes a main processor and a co-processor, where the main processor is a processor for processing data in a wake-up state, also referred to as a central processing unit (CPU); and the co-processor is a low-power processor for processing data in a standby state. In some embodiments, the processor 1401 is integrated with a graphics processing unit (GPU), and the GPU is responsible for rendering and drawing a content that the display screen needs to display. In some embodiments, the processor 1401 further includes an artificial intelligence (AI) processor for processing computing operations related to machine learning.

In some embodiments, the memory 1402 includes one or more computer-readable storage media; and in some embodiments, the computer-readable storage medium is non-transitory. In some embodiments, the memory 1402 further includes a high-speed random access memory and a non-volatile memory, such as one or more magnetic disk storage devices and flash memory storage devices. In some embodiments, the non-transitory computer-readable storage medium in the memory 1402 is configured to store at least one program code for being executed by the processor 1401 to implement the display method for the virtual prop provided by various embodiments of the disclosure.

In some embodiments, the terminal 1400 may further in some embodiments include: a peripheral device interface 1403 and at least one peripheral device. The processor 1401, the memory 1402, and the peripheral device interface 1403 can be connected by a bus or a signal line. Each peripheral device can be connected to the peripheral device interface 1403 by the bus, the signal line, or a circuit board. In some embodiments, the peripheral device includes: a display screen 1405.

The peripheral device interface 1403 is configured to connect at least one peripheral device related to I/O (Input/Output) to the processor 1401 and the memory 1402. In some embodiments, the processor 1401, the memory 1402, and the peripheral device interface 1403 are integrated on a same chip or circuit board. In some embodiments, any one or two of the processor 1401, the memory 1402, and the peripheral device interface 1403 are implemented on a separate chip or circuit board; and this embodiment does not limit thereto.

The display screen 1405 is configured to display a user interface (UI). In some embodiments, the UI includes a graphic, a text, an icon, a video, and any combination thereof. When the display screen 1405 is a touch display screen, the display screen 1405 also has the ability to collect a touch signal on or above the surface of the display screen 1405. The touch signal can be inputted as a control signal to processor 1401 for processing. In some embodiments, the display screen 1405 is further configured to provide a virtual button and/or a virtual keyboard, also referred to as a soft button and/or a soft keyboard. In some embodiments, one display screen 1405 is provided, and is arranged as a front panel of the terminal 1400. In some embodiments, at least two display screens 1405 are provided, and are respectively arranged on different surfaces of the terminal 1400 or in a folded design. In some embodiments, the display screen 1405 is a flexible display arranged on a curved or folded surface of the terminal 1400. Even, in some embodiments, the display screen 1405 is arranged in a non-rectangular irregular graphic, that is a special-shaped screen. In some embodiments, the display screen 1405 is made of a material such as a liquid crystal display (LCD) and an organic light-emitting diode (OLED).

In some embodiments, the terminal 1400 further includes one or more sensors 1410. The one or more sensors 1410 include, but are not limited to: an acceleration sensor 1411, a gyroscope sensor 1412 and a pressure sensor 1413.

In some embodiments, acceleration sensor 1411 detects acceleration magnitudes on three coordinate axes of a coordinate system established with the terminal 1400. For example, the acceleration sensor 1411 is configured to detect components of a gravitational acceleration on three coordinate axes. In some embodiments, the processor 1401 controls the display screen 1405 to display a user interface in a lateral view or a longitudinal view according to the gravity acceleration signals collected by the acceleration sensor 1411. The acceleration sensor 1411 is also configured to collect movement data of the game.

In some embodiments, the gyroscope sensor 1412 detects a body direction and a rotation angle of the terminal 1400, and the gyroscope sensor 1412 cooperates with the acceleration sensor 1411 to collect a 3D motion of the terminal 1400 by the user. The processor 1401 implements following functions according to the data collected by the gyroscope sensor 1412: motion sensing (for example, changing the UI according to a tilting operation of the user), game control, and inertial navigation.

In some embodiments, the pressure sensor 1413 is arranged on a side frame of the terminal 1400 and/or at a lower layer of the display screen 1405. When the pressure sensor 1413 is arranged on the side frame of the terminal 1400, a grip signal of the user to the terminal 1400 can be detected, and the processor 1401 performs left-right hand recognition or quick operation according to the grip signal collected by the pressure sensor 1413. When the pressure sensor 1413 is arranged at the lower layer of the display screen 1405, the processor 1401 controls an operability control on the UI interface according to a pressure operation of the user on the display screen 1405. The operable control includes at least one of a button control, a scroll-bar control, an icon control, and a menu control.

A person skilled in the art can appreciate that the structure shown in FIG. 14 is not a limiting of the terminal 1400 and can include more or fewer components than shown, or combine certain components, or employ different arrangements of components.

Figure 15:
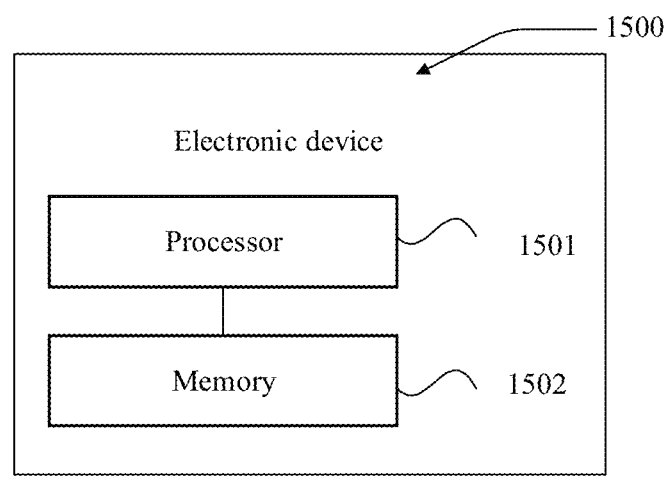
FIG. 15 is a schematic diagram of a structure of an electronic device according to some embodiments.

FIG. 15 is a schematic diagram of a structure of an electronic device according to some embodiments. The electronic device 1500 may generate a relatively large difference due to different configurations or performances, and includes one or more central processing units (CPU) 1501 and one or more memories 1502, where the memory 1502 stores at least one computer program, and the at least one computer program is loaded and executed by the one or more processors 1501, so as to implement the display method for the virtual prop provided by various embodiments described above. In some embodiments, the electronic device 1500 further has components such as a wired or wireless network interface, a keyboard and an input/output interface for input/output; and the electronic device 1500 also includes other components for achieving the functions of the device, which will not be described in detail herein.

In some embodiments, further provided is a computer-readable storage medium, such as a memory including at least one computer program which may be executed by a processor in the terminal to complete the display method for the virtual prop in various embodiments described above. For example, the computer-readable storage medium includes a read-only memory (ROM), a random-access memory (RAM), a compact disc read-only memory (CD-ROM), a magnetic tape, a floppy disk, an optical data storage device, etc.

In some embodiments, further provided is a computer program product or a computer program, including one or more program codes stored in the computer-readable storage medium. The one or more processors of the electronic device are capable of reading the one or more program codes from the computer-readable storage medium, and the one or more processors execute the one or more program codes to enable the electronic device to perform the display method for the virtual prop in the above-mentioned embodiments.

Those of ordinary skill in the art can appreciate that all or a portion of the operations for implementing the above-mentioned embodiments can be performed by hardware as well as by programming associated hardware. In some embodiments, the program is stored in a computer-readable storage medium; and in some embodiments, the above-mentioned storage medium is a read-only memory, a magnetic or optical disk, etc.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A display method for a virtual prop, performed by an electronic device, the method comprising:
displaying a virtual prop list in a virtual scene, the virtual prop list including a plurality of virtual props displayed in the virtual scene, the virtual prop list having an interactive option for at least one virtual prop;
displaying, based on a slide operation on the interactive option for a target virtual prop in the virtual prop list meeting a first target condition, a first target region separately from the virtual prop list, wherein the slide operation meets the first target condition based on the slide operation being a lateral slide operation; and
marking the target virtual prop in the virtual scene based on an operation end point of the slide operation being within the first target region.

2. The display method according to claim 1, wherein the slide operation further meets the first target condition based on the slide operation being toward a predetermined range of angles.

3. The display method according to claim 2, further comprising:
determining that the slide operation is the lateral slide operation based on an angle between a slide direction of the slide operation and a horizontal direction being within a target angle range.

4. The display method according to claim 1, wherein the first target region is at a proximity of the virtual prop list.

5. The display method according to claim 1, wherein the marking the target virtual prop comprises:
highlighting the interactive option for the target virtual prop in the virtual prop list.

6. The display method according to claim 1, wherein the marking the target virtual prop comprises:
displaying a mark graphic at a proximity of the target virtual prop in the virtual scene.

7. The display method according to claim 6, wherein the mark graphic is visible in fields of view of both a controlled virtual object and a friend virtual object, and
wherein the friend virtual object and the controlled virtual object are on a same team or in a same camp.

8. The display method according to claim 6, wherein the marking the target virtual prop further comprises:
displaying a current distance between the target virtual object and a controlled object along with the mark graphic.

9. The display method according to claim 1, further comprising:
based on a click operation on the interactive option, controlling the controlled virtual object to pick up the target virtual object.

10. The display method according to claim 1, further comprising:
   displaying the interactive option for the target virtual prop to move along a slide trajectory of the slide operation.

11. A display apparatus for a virtual prop, the display apparatus comprising:
   at least one memory configured to store program code; and
   at least one processor configured to read the program code to:
      display a virtual prop list in a virtual scene, wherein the virtual prop list includes a plurality of virtual props displayed in the virtual scene, wherein the virtual prop list includes an interactive option for at least one virtual prop;
      display, based on a slide operation on the interactive option for a target virtual prop in the virtual prop list meeting a first target condition, a first target region separately from the virtual prop list, wherein the slide operation meets the first target condition based on the slide operation being a lateral slide operation; and
      mark the target virtual prop in the virtual scene based on an operation end point of the slide operation being within the first target region.

12. The display apparatus according to claim 11, wherein the slide operation further meets the first target condition based on the slide operation being toward a predetermined range of angles.

13. The display apparatus according to claim 12, wherein the at least one processor is further configured to read the program code to:
   determine that the slide operation is the lateral slide operation based on an angle between a slide direction of the slide operation and a horizontal direction being within a target angle range.

14. The display apparatus according to claim 11, wherein the first target region is at a proximity of the virtual prop list.

15. The display apparatus according to claim 11, wherein the at least one processor is further configured to read the program code to:
   highlight the interactive option for the target virtual prop in the virtual prop list.

16. The display apparatus according to claim 11, wherein the at least one processor is further configured to read the program code to:
   display a mark graphic at a proximity of the target virtual prop in the virtual scene.

17. The display apparatus according to claim 15, wherein the mark graphic is visible in fields of view of both a controlled virtual object and a friend virtual object; and
   wherein the friend virtual object and the controlled virtual object are on a same team or in a same camp.

18. A non-transitory computer-readable storage medium storing computer code that when executed by at least one processor causes the at least one processor to:
   display a virtual prop list in a virtual scene, the virtual prop list including a plurality of virtual props displayed in the virtual scene, the virtual prop list having an interactive option for at least one virtual prop;
   display, based on a slide operation on the interactive option for a target virtual prop in the virtual prop list meeting a first target condition, a first target region separately from the virtual prop list, wherein the slide operation meets the first target condition based on the slide operation being a lateral slide operation; and
   marking the target virtual prop based on an operation end point of the slide operation being within the first target region.

* * * * *